US008838614B2

(12) United States Patent  
Koperda et al.

(10) Patent No.: US 8,838,614 B2
(45) Date of Patent: Sep. 16, 2014

(54) METHOD AND SYSTEM FOR DOCUMENT CLASSIFICATION OR SEARCH USING DISCRETE WORDS

(71) Applicant: NextGen Datacom, Inc., Dawsonville, GA (US)

(72) Inventors: Frank R. Koperda, Dawsonville, GA (US); Tamara E. Koperda, Dawsonville, GA (US)

(73) Assignee: NextGen Datacom, Inc., Dawsonville, GA (US)

( * ) Notice: Subject to any disclaimer, the term of this patent is extended or adjusted under 35 U.S.C. 154(b) by 0 days.

(21) Appl. No.: 13/682,642

(22) Filed: Nov. 20, 2012

(65) Prior Publication Data

US 2013/0144874 A1 Jun. 6, 2013

Related U.S. Application Data

(62) Division of application No. 12/940,923, filed on Nov. 5, 2010, now Pat. No. 8,316,030.

(51) Int. Cl.
*G06F 17/30* (2006.01)
(52) U.S. Cl.
CPC ...... *G06F 17/3053* (2013.01); *G06F 17/30657* (2013.01)
USPC .......................................................... 707/748
(58) Field of Classification Search
USPC .......................................................... 707/748
See application file for complete search history.

(56) References Cited

U.S. PATENT DOCUMENTS

| 5,131,272 | A | 7/1992 | Minei et al. |
| 5,187,643 | A | 2/1993 | I-Shou |
| 5,329,427 | A | 7/1994 | Hogdahl |
| 5,634,084 | A * | 5/1997 | Malsheen et al. ............. 704/260 |
| 6,028,764 | A | 2/2000 | Richardson et al. |
| 6,147,862 | A | 11/2000 | Ho |
| 6,216,185 | B1 | 4/2001 | Chu |
| 6,377,446 | B1 | 4/2002 | Liau |
| 7,756,535 | B1 * | 7/2010 | Diao et al. .................... 455/466 |
| 8,260,731 | B2 * | 9/2012 | Maruyama et al. ............. 706/20 |
| 2003/0090866 | A1 | 5/2003 | Kuo |

(Continued)

OTHER PUBLICATIONS

Sparck Jones, Karen, et al. *Readings in Information Retrieval*, (1997), Morgan Kaufmann ISBN 1558-60-454-4. Paper within above Book: "AnAlgorithm for Suffix Stripping"by M.F. Porter: pp. 313-316.

(Continued)

*Primary Examiner* — Cam-Y Truong
(74) *Attorney, Agent, or Firm* — GSS Law Group

(57) ABSTRACT

A method of operating a computerized document search system where information is matched against a database containing documents in response to user queries includes receiving a query identifying a source document that has information content related to the documents within the database. Important words within the source document are detected automatically, where at least one of the important words has been processed using at least two dictionary functions consisting of Derived Words, Acronym, Word Capitalization, and Hyphenation. An importance value is generated for important words in a processed document using a WordRatio and at least one of a selected set of values. A score is generated for a processed document based partly on the importance value of at least one important word in that document. A document list is created for identifying documents that are related to a source document.

17 Claims, 16 Drawing Sheets

Example Processing of a Database Search

(56) References Cited

U.S. PATENT DOCUMENTS

2003/0156383 A1    8/2003  Jenkins et al.
2010/0280981 A1*  11/2010  Kato et al. .................. 706/20
2011/0161144 A1*   6/2011  Mizuguchi et al. .......... 705/14.4

OTHER PUBLICATIONS

Salton, Gerard. et al., "A theory of term Importance in automatic text analysis", (1974).

Price, et al., "The clustering of low frequency words in academic webs", Am. Soc. for Information Science and Technology, (2005), vol. 56, pp. 883-888.

Salton, Gerard, et al., "Term-Weighting Approaches in Automatic Text Retreival", Information and Processing Management, vol. 23, No. 5, pp. 513-423.

Comeau, Donald C., et al., "Non-Word Identification or Spell Checking Without a Dictionary", Journal of the American Society for Information Science and Techology, 55(2), pp. 169-177, (2004).

* cited by examiner

FIG. 3    SearchWords Dictionary

| Reference Document | | | Related Document | Search Control |
|---|---|---|---|---|
| 5,160,161 | | | | *Find Related Doc* |
| *Analyze Doc* *Show Doc* | | | *Analyze Doc* *Show Doc* | Start Date / End Date |
| FSV(FailSafeValve) | 0.95 | 54 * | | Limit: top 50 / Quality (1-10) |
| pn | 0.86 | 42 * | | |
| PCV(Pressure Co.. | 0.86 | 25 * | | |
| PCV | 0.82 | 25 * | | |
| altitude | 0.76 | 17 * | | |
| PPO | 0.75 | 9 * | | |
| ps | 0.72 | 39 * | | |
| PSD | 0.71 | 15 * | | |
| pi | 0.67 | 12 * | | |
| pr | 0.62 | 10 * | | |
| poppet | 0.59 | 27 * | | |
| answer | 0.52 | 8 * | | |
| abnormal | 0.51 | 11 * | | |

FIG. 8 – Presentation Manager (Words in Reference Document)

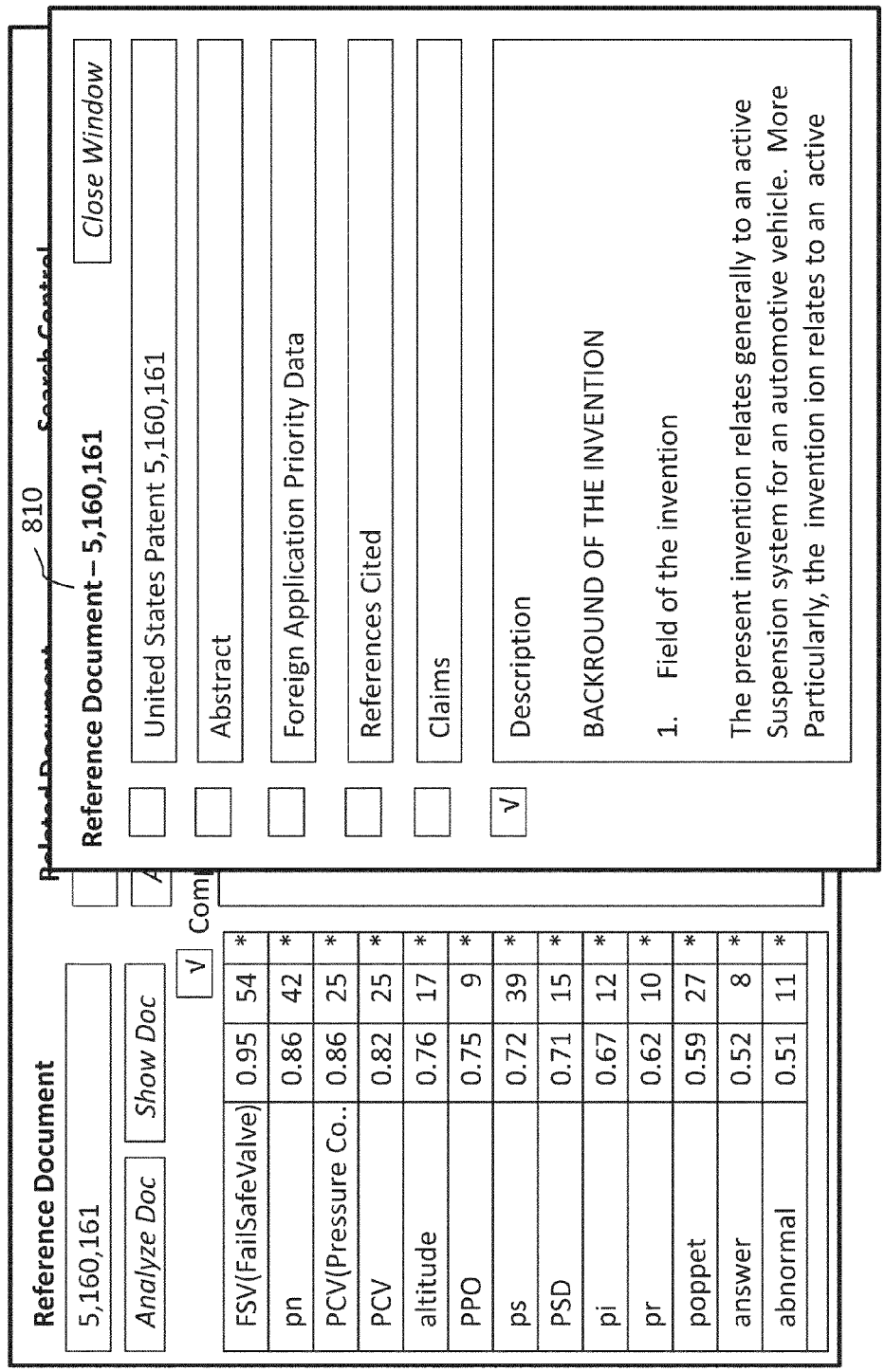
FIG. 9 – Presentation Manager (Showing Reference Document)

Reference Document

5,160,161

*Analyze Doc*  *Show Doc*

| | | | ☑ |
|---|---|---|---|
| FSV(FailSafeValve) | 0.95 | 54 | * |
| pn | 0.86 | 42 | * |
| PCV(Pressure Co.. | 0.86 | 25 | * |
| PCV | 0.82 | 25 | * |
| altitude | 0.76 | 17 | * |
| PPO | 0.75 | 9 | * |
| ps | 0.72 | 39 | * |
| PSD | 0.71 | 15 | * |
| pi | 0.67 | 12 | * |
| pr | 0.62 | 10 | * |
| poppet | 0.59 | 27 | * |
| answer | 0.52 | 8 | * |
| abnormal | 0.51 | 11 | * |

Related Document

*Analyze Doc*  *Show Doc*

Compare Words — 817

Search Control — 811

*Find Related Doc* — 814

*Start Date / End Date* — 812, 813

Limit: top 50 / Quality (1-10) — 815

| 5,160,161 | 10 | Working fluid circuit with line pressure |
| 5,092,625 | 6 | Fail detecting system for electromag.. |
| 5,044,661 | 6 | Working fluid circuit with line pressure |

— 816

FIG. 10 – Presentation Manager (Database Search Results)

| Reference Document | | | | Related Document | | | | Search Control | | |
|---|---|---|---|---|---|---|---|---|---|---|
| 5,160,161 | | | | 5,092,625 | | | | *Find Related Doc* | | |
| Analyze Doc | Show Doc | | | Analyze Doc | Show Doc | | | Start Date / End Date | | |
| | | | ✓ | Compare Words — 817 | | | | Limit: top 50 / Quality (1-10) | | |
| FSV(FailSafeValve) | 0.95 | 54 | * | FSV(FailSafeValve) | 0.52 | 8 | * | 5,160,161 | 10 | Working fluid circuit with line pressure |
| pn | 0.86 | 42 | * | pn | 0.51 | 4 | * | 5,092,625 | 6 | Fail detecting system for electromagnetic |
| PCV(Pressure Co.. | 0.86 | 25 | * | PCV(Pressure Co.. | 0.96 | 55 | * | 5,044,661 | 6 | Working fluid circuit with line pressure |
| PCV | 0.82 | 25 | * | PCV | 0.96 | 55 | * | | | |
| altitude | 0.76 | 17 | * | altitude | 0.20 | 2 | * | | | |
| PPO | 0.75 | 9 | * | | | | | | | |
| ps | 0.72 | 39 | * | | | | | | | |
| PSD | 0.71 | 15 | * | | | | | | | |
| pi | 0.67 | 12 | * | pi | 0.41 | 4 | * | | | |
| pr | 0.62 | 10 | * | pr | 0.81 | 19 | * | | | |
| poppet | 0.59 | 27 | * | poppet | 0.59 | 29 | * | | | |
| answer | 0.52 | 8 | * | answer | 0.11 | 1 | * | | | |
| abnormal | 0.51 | 11 | * | | | | | | | |

820

FIG. 11 – Presentation Manager (Compare Words between docs)

| Reference Document | | | | Word Information - PSD | Close Window |
|---|---|---|---|---|---|
| 5,160,161 | | | | | |
| Analyze Doc | Show Doc | | | ☐ Usage | |
| | ✓ | | Com | ☑ Acronym Information | |
| FSV(FailSafeValve) | 0.95 | 54 | * | Specific Acronyms using these letters | |
| pn | 0.86 | 42 | * | PSD(PhaseSensitiveDemodulator) | |
| PCV(Pressure Co.. | 0.86 | 25 | * | PSD(PositionSensingDevice) | |
| PCV | 0.82 | 25 | * | PSD(PostalSecurityDevice) | |
| altitude | 0.76 | 17 | * | PSD(PacketStartDetection) | |
| PPO | 0.75 | 9 | * | PSD(PacketSwitchedData) | |
| ps | 0.72 | 39 | * | PSD(ParticleSizeDistribution) | |
| PSD | 0.71 | 15 | * | PSD(PersonalSecurityDevices) | 826 |
| pi | 0.67 | 12 | * | | |
| pr | 0.62 | 10 | * | ☐ Same as psd, PSDs, psds | |
| poppet | 0.59 | 27 | * | ☐ Statistics | |
| answer | 0.52 | 8 | * | ☐ Top patent classifications for this word | |
| abnormal | 0.51 | 11 | * | ☐ List of patents | |

825

FIG. 12 – Presentation Manager (Word Information)

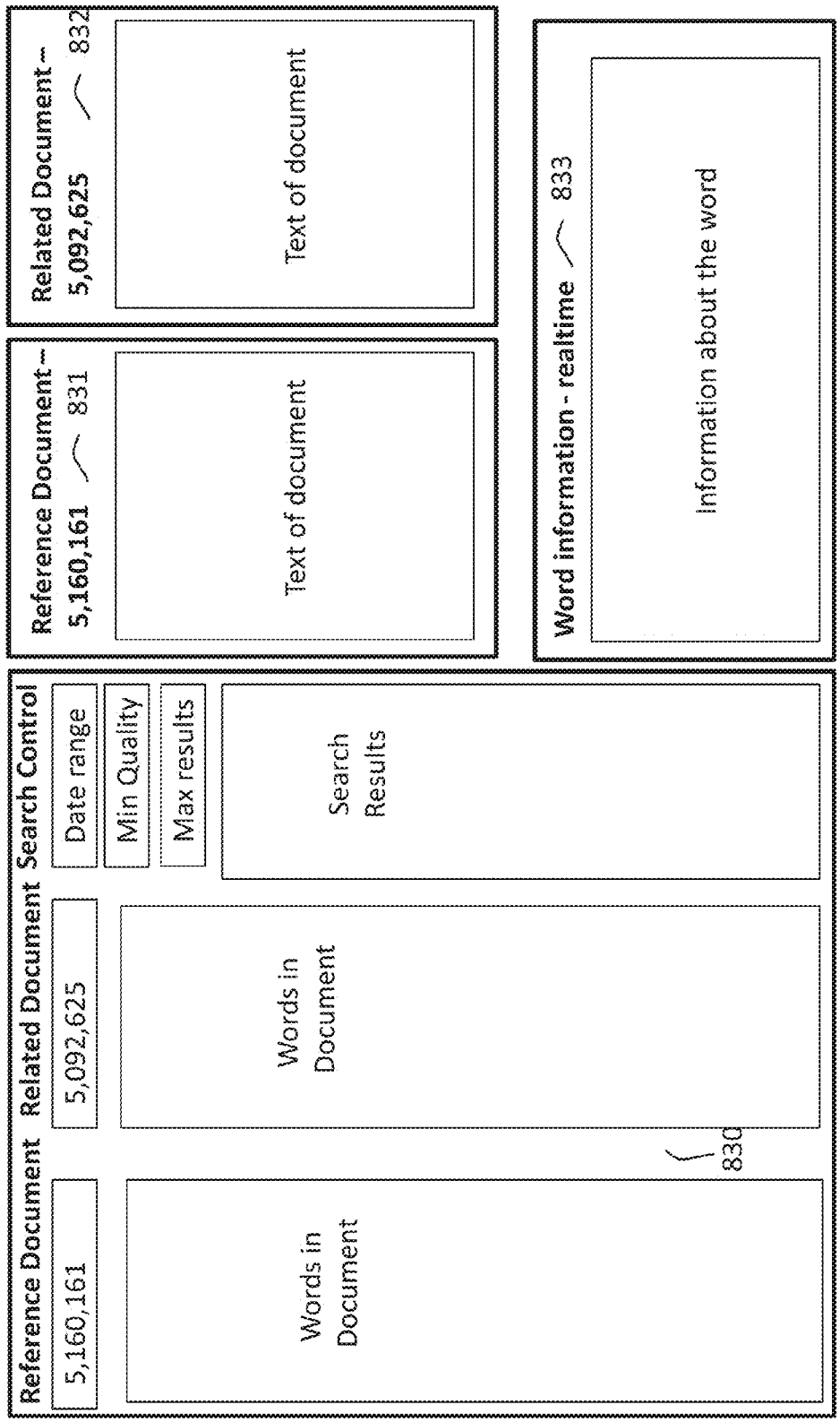
FIG. 13 – Presentation Manager (Multiple Windows)

| | | | |
|---|---|---|---|
| FSV(FailSafeValve) | 0.95 | 54 | * | FSV |
| pn | 0.86 | 42 | * | pn |
| PCV(Pressure Co.. | 0.86 | 25 | * | PCV |
| PCV | 0.82 | 25 | * | PCV |
| altitude | 0.76 | 17 | * | altit |
| PPO | 0.75 | 9 | * | |
| ps | 0.72 | 39 | * | |
| PSD | 0.71 | 15 | * | |
| pi | 0.67 | 12 | * | pi |
| pr | 0.62 | 10 | * | pr |
| poppet | 0.59 | 27 | * | pop |
| answer | 0.52 | 8 | * | ansv |
| abnormal | 0.51 | 11 | * | |

Word Information — *Close Window*
realtime
Type in word to get its information — 840

Word Information - realtime — 841 *Close Window*

Search Control
*Find Related Doc*

☑ Usage – realtime is a Search Word, Hyphen word
Hyphen Word variants: real-time, real time, realtime
Hyphen Word variants: real-timeness, real timeness, realtimeness ☑ Same as relatime, real-time, realtimes, realtimely, realtimeness, real-timeness ☑ Statistics – It occurred 619,017 times in 164,195 patents.
Word Importance:   0.564
WordRatio for lowest 10%:   0.001
Median WordRatio:   0.003
WordRatio for highest 90%:   0.012

☑ Top patent classifications for this word
8.3 % of words are in Class 370 (Multiplex Communica..
7.5 % of words are in Class 348 (Television )

☑ List of Patents (Top 50 of 164,195)
Patent   #Words   Word Ratio
7,154,910   429   0.599

FIG. 14 – Presentation Manager (Request Word Information)

| Reference Document | | | | Related Document | | | | Search Control | |
|---|---|---|---|---|---|---|---|---|---|
| 5,160,161 | | | | 5,092,625 | | | | *Find Related Doc* | |
| *Analyze Doc* | *Show Doc* | | ☐ | *Analyze Doc* | *Show Doc* | | | *Start Date / End Date* | |
| | | | | Compare Words | | 850 | | Limit: top [50] / Quality [5] | |
| FSV(FailSafeValve) | 0.95 | 54 | * | PCV(PressureCo.. | 0.97 | 55 | * | 5,160,161 | 10 | Working fluid circuit with line pressure |
| pn | 0.86 | 42 | * | PCV | 0.96 | 55 | * | | | |
| PCV(Pressure Co.. | 0.86 | 25 | * | fu | 0.84 | 7 | * | 5,092,625 | 6 | Fail detecting system for electromag.. |
| PCV | 0.82 | 25 | * | EPA(EuropeanPa.. | 0.82 | 9 | * | | | |
| altitude | 0.76 | 17 | * | vehicular | 0.80 | 22 | * | 5,044,661 | 6 | Working fluid circuit with line pressure |
| PPO | 0.75 | 9 | * | EPA | 0.77 | 9 | * | | | |
| ps | 0.72 | 39 | * | dither | 0.70 | 24 | * | | | |
| PSD | 0.71 | 15 | * | PRV(PressureReg.. | 0.70 | 17 | * | | | |
| pi | 0.67 | 12 | * | fl | 0.69 | 8 | * | | | |
| pr | 0.62 | 10 | * | PRV | 0.69 | 17 | * | | | |
| poppet | 0.59 | 27 | * | pr | 0.68 | 11 | * | | | |
| answer | 0.52 | 8 | * | multistage | 0.65 | 9 | * | | | |
| abnormal | 0.51 | 11 | * | failsafe | 0.62 | 8 | * | | | |

FIG. 15 – Presentation Manager (Words in Related Document)

METHOD AND SYSTEM FOR DOCUMENT CLASSIFICATION OR SEARCH USING DISCRETE WORDS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates to document management. The methods and system describe a new approach to performing document searching and document classification by providing more automation and greater reliability which yields better results than prior-art systems.

BACKGROUND OF THE INVENTION

Through the years, there have been many different forms and methods used to identify and classify documents by using computer automation. Across many different industries, there exists a need to find other documents that are similar to a specified document. There also exists a need to take a document and assign it to one of a multiplicity of document categories. Generically, these are known as document search and document classification functions.

One example of the usefulness of document search and classification can be found in the industry associated with intellectual property, specifically patents. The ideas that describe the invention are contained in a document that may often contain figures and a textual description that allow others to understand its concepts. When applying for a patent, this document description is the basis for assigning it (classifying it) to one or more technology fields. As part of the process in obtaining the patent, other documents are searched to determine if the concepts of this new invention are indeed novel and unique.

Many of the algorithms used in performing the search and classification functions do this by using individual words. In some prior-art systems, a list of the unique words is obtained and the number of times each word occurs is noted. This list of words is often used as the basis of performing the document search. For example in U.S. Pat. No. 6,189,002, the frequency count (number of times the word is used in a document) is either the actual occurrence value if it occurs less than six times or equal to 6+log 10(Count) if greater than six times.

In evaluating how well a reference document matches other documents, a metric relating the reference document and the unknown document is typically required. In these types of prior-art systems, the word list extracted from the reference document is compared to the unknown document. The selection of the words that are extracted from the reference document and the algorithm used to compare the selected sets of words between the two documents are principal points of distinction for these existing systems.

Some of the methods known in the art for this selection of words include using all of the words found in the document, excluding a small subset of the most common words (e.g. the, and, or, is), or some number of times that the word occurs. The importance of each word may be the same or the importance of the word may be adjusted based on the number of times the word occurs in a document. Therefore, when the word list of the reference document is compared against the word list of the unknown document, these simple matching algorithms produce results that are often less than satisfactory.

It is also common that the reference document and the unknown documents are of significantly different length which causes problems when the matching algorithm is wholly or partly dependent upon the number of times a word occurs. In a longer document, the count (number of occurrences) for a word is likely to be higher than for the shorter unknown document. It is often difficult to establish the true length of the document when documents contain tables of data, code listings, figures, table of contents, glossary of terms, or an index showing where topics are in a document.

The problems mentioned above for comparing two documents, can also occur when a document must be classified into one or more specific categories. In the example of submitting a document during the patent application process, a determination must be made as to the major and minor patent classification categories. Should the document be a patent, it will be assigned to a primary and perhaps one or more secondary patent classifications. It is common for a patent to contain ideas that embody multiple patent classification categories and thus requires a decision to be made as to which of the ideas takes precedent in assigning the primary classification number.

A need exists to better identify and extract the significant words from a document and to provide a better technique in creating the metric that accurately reflects the degree of similarity of two or more documents.

BRIEF SUMMARY OF THE INVENTION

The invention is both a system and a method for automatically performing document searching and document classification. The novel teachings of the invention include creating inter-dependent dictionaries, automatic identification of keywords, assigning dynamic, context-sensitive importance value for keywords, rapid document matching from very large databases, and document classification based on self-learning algorithms. The methods of the invention for document search/classification are suitable for implementation on a wide variety of processing platforms which provides much greater versatility than prior-art inventions.

To facilitate accurate document searching and document classification, electronically accessible documents are processed with a collection of inter-related dictionaries to minimize the variations of words, word capitalization, hyphenation, and other variations that normally occur between different authors. In addition, important words in a document are automatically identified and a different level of importance assigned to each word depending on its importance determined by a combination of factors such as its importance across many documents, within a document, in each document section, or the ratio with respect to other words within the document. The documents to be analyzed, database of documents, processing systems, and user input/output are operate across a range of device capabilities and are flexible in their physical placement.

The use of inter-dependent dictionaries overcomes problems of prior-art dictionaries in that it properly resolves conflicts of ambiguous words. For example, writers may use "real-time" (hyphenated), "realtime" (one word) or "real time" (two words). "BOSS" can be just the capitalized word "boss" (a form of emphasis) or an acronym "BOSS" meaning "Binary Oriented Set Sequencing" or the plural acronym "BOSs" meaning "Back Office System". It also brings together words that are meant to be the same. For example, misspelled variations of a word, various tenses of a word (e.g. past, present, future), and American/British English variation (e.g. "fibre" for "fiber" or "centre" for "center").

Automatic identification of keywords in a document of an embodiment of the invention is achieved by understanding the topic area of a document, the section of the document in which the word occurs, and assigning an importance valued based on how many times each specific word occurs in a document (based on a normalized size of the document). Besides its use in the document being analyzed, and unlike prior-art inventions, the dynamic importance value of a word (based on topic area, section of document, and normalized occurrence) is also applied to the documents being matched in the database for searching/classifying.

Using a desktop personal computer such as the Intel® Q6600 with 2 GB DRAM and running on the Microsoft Windows Vista™ operating system, a 30 page patent document can be analyzed in under one second. In this analysis, the words are extracted (and similar words grouped), ambiguities of meaning resolved, keywords identified, a unique importance value(s) assigned to each word, and the meaning of all acronyms understood (even if the writer did not specify its meaning). Typically, 60-80 words in a document are identified as important even when words only occur once or twice in the document.

When this invention is applied to identifying patents that may be related to the analyzed document (the reference document), the identification of similar documents (i.e. document searching) would be very rapid. Each of the 60-80 keywords of the reference document would be matched to documents in the database (e.g. the US patent database of 3.7 million on-line documents) where the corresponding word would be matched (based on topic area, section of document, and normalized occurrence). A typical search time of 60 keywords (each with different importance values) in a database of 3.7 million documents is 17 seconds for a typical PC.

When this invention is applied to classifying the analyzed document (the reference document), the identification of which group or multiple groups are most logically related (i.e. document classification) would be very rapid and not require the assistance of those skilled in the topic area. If the document classifications have been established and examples exist of documents in these classifications, the identification of the important words and the classification of subsequent documents is both automatic and rapid.

Just as in the algorithm that identifies acronyms that are not defined (explained in detail below), the use of the dynamic importance value for each word in identifying the list of words that are most different between classifications can be applied to document classification. Using the integrated dictionaries, a good identification of keywords is possible. Knowing which combination of the keywords provides the greatest accuracy in distinguishing between classifications, allows the optimized list of keywords to be established. As subsequent documents are presented, this keyword list is then used (along with the dynamic importance value) to establish the best class(es) for the new document. For the typical PC described above, the classification process can be approximately 100 documents classified in one second.

BRIEF SUMMARY OF THE DRAWINGS

FIG. 8 is an example of a Presentation Manager showing the words in the Reference Document.

FIG. 9 is an example of a Presentation Manager showing a Reference Document.

FIG. 10 is an example of a Presentation Manager showing database search results.

FIG. 11 is an example of a Presentation Manager comparing words between documents.

FIG. 12 is an example of a Presentation Manager showing detailed information about a selected word.

FIG. 13 is an example of a Presentation Manager showing multiple open windows.

FIG. 14 is an example of a Presentation Manager where a user initiates a request for information about any word Information.

FIG. 15 is an example of a Presentation Manager where all the words from a Related Document are shown.

DETAILED DESCRIPTION OF THE INVENTION

A system and a method are provided for understanding the words contained within a document. Having an accurate understanding of the words in a document, it is possible to at least obtain more accurate document search results and better document classification. Though the technology provides more accurate document search/classification results than prior art approaches, the teachings of this invention are not restricted to only those benefits and applications.

Throughout this description, the embodiments and examples shown should be considered as exemplars, rather than as limitations on the present invention. While examples referenced herein relate to a document search application one skilled in the art will understand how to apply the embodiments disclosed herein to many more applications without departing materially from the scope of the invention.

Figure 1:
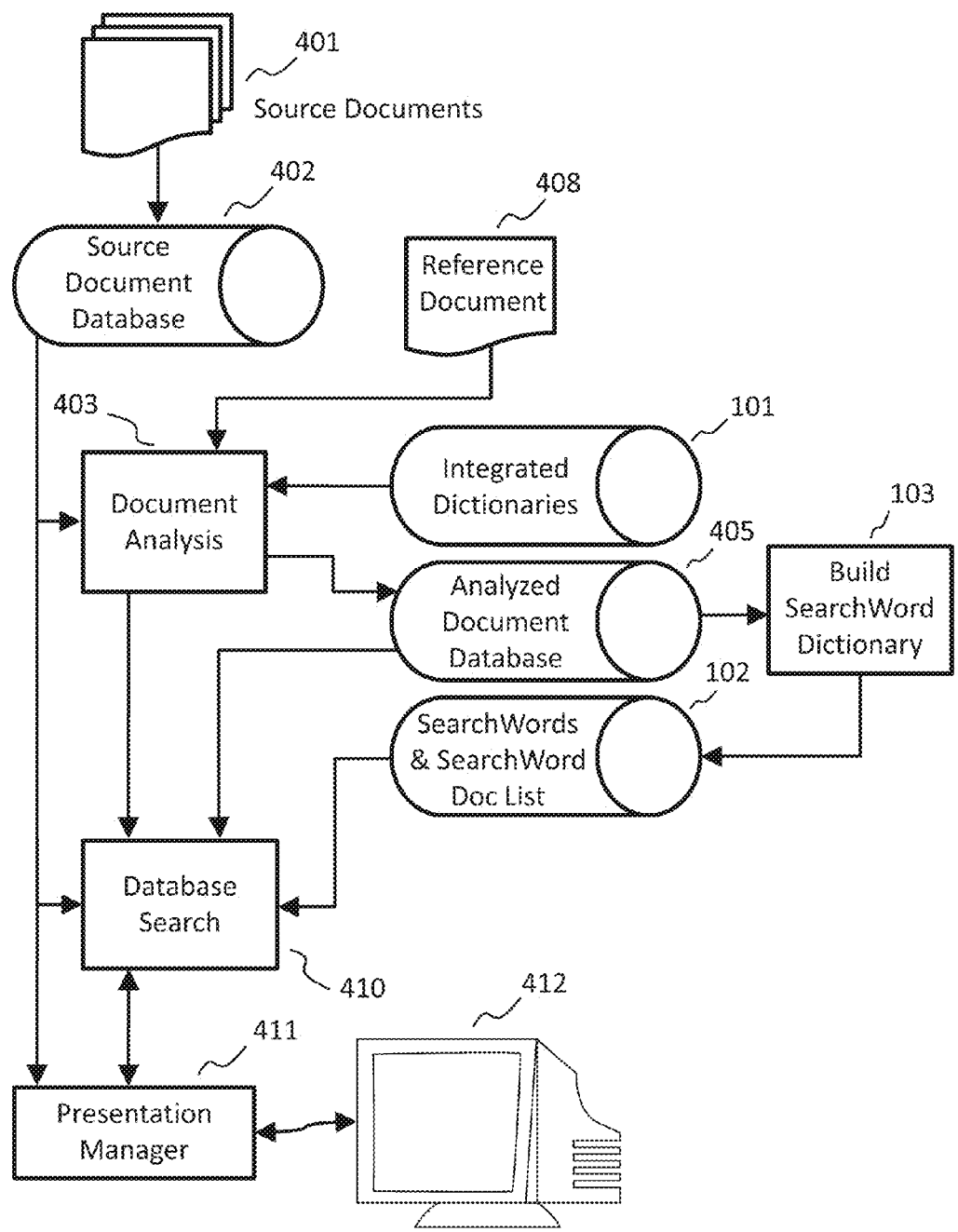
FIG. 1 is a block diagram of an example of main processing blocks of the document search/classification functions.

FIG. 1 provides a broad overview of the major processing blocks as used in the document search/classification applications of the technology. Under most circumstances multiple words from one document (block 408) will be compared against multiple words in each document of a group of documents (block 402). In an exemplary embodiment of this invention, the basic set of potential words that can be used in matching documents (i.e. SearchWords) is established before analyzing a document (403). Following the creation of the list of SearchWords (103), the searching for matching documents or the classification of a document is done (410). The results of that matching are combined with other useful information (411) and presented to the user (412).

For purposes of exampling how embodiments of the invention operate, the discussion that follows separates the finding of the important search words in a document and the search/classification of documents. There is no limitation of the algorithm that should be inferred and some/all of the SearchWords can be created/used dynamically during the document search and classification.

There are many complications in selecting a word from one document and using it to match a word in another document. The word can have many forms, such as verbs which have past, present, and future tense. Nouns can be singular or plural. Words can be misspelled, can be hyphenated, or can be abbreviated. Embodiments of the invention use a combination of inter-related dictionaries (101) to create a consistent set of words allowing for greater accuracy in comparing documents.

When words from a reference document are used to match words in a database of many thousands of documents (405), inevitably there will be some words that match and some words that do not match. To identify the documents that are most similar, usually some type of quantitative scoring system is part of the matching algorithm. The simplest approach is to assume that all words are to be treated equally and have the same importance. Another approach is to assume that the more a word is used in a document, the more it should be considered to have higher importance. A different approach is to assume that each word has an importance which may differ from another word but always retains the same value between documents. In this invention, the importance of a word is based on both the intrinsic value established for that word across all documents and then this established value is dynamically adjusted based on the word's importance to the current document.

Discussion of Processing of Words

To overcome some of the difficulties of processing of the words in documents, it is useful to understand how some of the problems have been solved. While the following is not an exhaustive list of the problems, many problems can be grouped into one of the following areas:
- Derived Words—Creating a simplified list of words that get rid of variations of a word (spelling, verb tense, possessive nouns, plural forms, etc.)
- Hyphenated words—Creating a single form of a hyphenated word (i.e. single word, two words)
- Acronyms—Same letters for different meaning of an acronym, multiple ways to say the same acronym, switching the order of the words in an acronym.
- Establishing the importance of a word across all documents
- Establishing the importance of a word within a document
- Establishing the importance of a word within a specific section of a document The first three of the items in the above list are related to dealing with the large variations associated with words. Without directly addressing the question of exactly what is a word, the algorithms of this invention provide mechanisms for dealing with variations of words. It is possible to provide better matching results by matching the writer's intent of the word rather than by matching each form of a word (e.g. singular, plural, past tense, present tense, and misspelling).

During the development of this invention, it was hoped that the use of standard dictionaries would provide adequate simplification for many words. This proved not to be the case for a variety of reasons. Among these are the fact that in many specialized areas that there are too many technical words that are not present in common dictionaries, inventors seem to be as creative in making up words as they in creating inventions, and there are more ways to misspell a word than word spelling dictionaries are able to fix.

It was found that to achieve good results, it was necessary for the dictionaries to be dynamically updated and, to reduce requirements for human intervention, it was necessary for this to be an automated process. Misspelled words were identified by scanning through millions of documents and then linking the misspelled words to the correct spelling of the word. While this may seem superficial, the real benefit of the eliminating misspelled words is that it is not later identified as an important SearchWord. Since the selection of SearchWords is done through an automated process, it is possible for the misspelled word to occur enough times, and in a limited number of technologies that it mistakenly appears to be an important word.

Embodiments of the invention utilize a concept of a "Derived Word" which represents the multitude of variations for that word. A more complete discussion of this aspect of the invention will be discussed later. At its heart, the concept of the derived word is that there is a single word that is used in place of a group of many different words. The important aspect of this group is that documents that contain any form of the word are likely to be discussing the same thing.

Another problem with words is how to represent hyphenated words so that all the various forms of that word are treated uniformly. A hyphenated word can be two (or more) words jointed by a hyphen ("-"). In practice, people use two separate words, or one word without the hyphen, or they can use a hyphen (and not necessarily in the same place). Better matching results can be obtained by creating a uniform way to handle an individual hyphenated word. All hyphenated words are not treated in the same manner.

In the exemplary system created, all hyphenated words in millions of documents were examined to see the most common form of the hyphenated word (i.e. single word or two words). In analyzing a document, each hyphenated word, single form of that hyphenated word, two words with no hyphen, and misspelling of each of the words in the hyphenated word, are mapped over to a single form of the word. This process eliminates the variations used by different authors and thus provides enhanced document matching results.

Yet another aspect of the complexity of words is the use of acronyms. One might think of an acronym as being a collection of letters (e.g. ABC) that replace several words. There are many examples of an acronym (the collection of letters) being used by different groups of people and having the acronym phrase (the words that replace the collection of letters) meaning something entirely different. For example, ACS can mean "Auxiliary Cooling System" when used by people doing air conditioning, "Attitude Control Subsystem" in the aviation industry, or "Automatic Color Selection" in the TV industry. When an acronym can have more than one meaning, it is called an "overloaded" acronym.

The algorithms of this invention automatically identify acronyms, acronym phrases, variation of an acronym phrase, and also determine which meaning of the "overloaded" acronym is being used. While people find it relatively easy adapt to these variations in comparing documents, it is not easy for computers to compensate for the number of possible combinations.

The algorithms of this invention are mechanisms for dealing with the large variations associated with words. This system utilizes a concept of a "Derived Word" which represents the multitude of variations for that word. Another algorithm identifies how to represent hyphenated words so that all the possible forms that might be used in a document are made to be uniform. The third algorithm identifies acronyms, acronym phrases, variation of an acronym phrase, and also determines which meaning of the "overloaded" acronym is being used.

In systems that assign different values to various words, a technique must exist to determine what this value should be. Depending on the algorithm, there may be a great deal of subjectivity in assigning that value. The present invention automatically analyzes a corpus of documents to algorithmically establish a base value for a word and then dynamically adjusts this base value based on the word's importance to the document being analyzed. Some notable benefits of this of this approach is that there is not a need for human intervention in determining a word value, it is not dependent on any specific technology being discussed in the document, and the algorithm is not computationally intensive.

Under some situations the count of the number of times a word occurs can be meaningful. This raw number is useful by itself but becomes more useful if the length of the document is known. While the ratio of the count of the number divided by the total number of words is more useful, it was found that this method becomes unreliable because of data tables, figures, chemical and math formulas, or indexes. A more sophisticated algorithm is used in the preferred embodiment of this invention.

Methods of the Invention

Dictionaries

Listed below are dictionaries used in the preferred embodiment. For the purposes of explanation, these dictionaries are described individually to aid in the understanding of the functions needed for document search/classification. The dictionaries of an embodiment of the invention should be considered as the functions being provided and the implementation can be as separate dictionaries or, in alternate embodiments, two or more of the dictionaries can be combined.

While the dictionaries can be a static collection of words, the equivalent functions provided by the dictionaries can also be dynamically created. For example, those skilled in the art understand that spelling correction can be achieved through known algorithms such as correcting individual letters based on their proximity of the keyboard. Using static dictionary words and using dynamic dictionary words to achieve the same functions are contemplated as being alternate embodiments of this invention.

Derived Words

There are at least four aspects of a "Derived Word". The derived word can represent words with similar meaning, various forms and tenses, misspelled variations for each of the words, and made up words. While all four of these are described as a single concept, it is understood that these could be implemented independently or in any combination. Indeed it has been found, that separating the spelling correction from the similar meanings can be useful during certain aspects of analysis.

In maintaining the software implementing the invention, it was also found that dynamically updating the list of "made up words" that should be mapped over to the derived word, was useful. One form of "made up words" are "real words" (i.e. found in a standard dictionary) that have been adapted. At some point these "made up words" may even become "real words". For example engineers are notorious for taking nouns and making them verbs (e.g. the company providing web search is Google and "Goggling" became a common term that meant doing a web search even if it was not done on the Google website, or modular becomes modularize). The important aspect of these "made-up words" is that when they occur frequently enough across multiple documents, they must be incorporated into the algorithm so that satisfactory matching results are obtained.

Unlike a synonym, the derived word is not intended to mean exactly the same as all the other words that are grouped together. The concept of the derived word is that there is a single word that is used in place of many different single words. The important aspect of this group of many words is that documents that contain any form of the word are likely to be discussing the same thing.

For example, the word "pilot" may the derived word for "pilots" (the plural form of the word), "piloting", "piloted", "pilotability", "pilotable", "pilotss" (plural possessive), "pilotings", "pilotingly". While the last two may not be considered "real words" by a dictionary, none-the-less they were used by people within various patents. In the present invention, one aspect of correctly search for similar documents or classifying similar documents is identifying words that are likely discussing something similar. The linguistic correctness of such words is almost irrelevant in the use of discrete words for matching.

Some of the variations of a word in the present invention are part of a well known process of word stemming, using the stem part of a word. In the preferred embodiment, a subset of the entries for a word comprises those words obtained from the Porter Stemming Algorithm. Other stemming algorithms or lists of extremely similar words whose meanings are invariant over different topic areas may also be included in alternate embodiments.

Unlike many prior-art dictionaries that focus on nouns or noun phrases (e.g. U.S. Pat. No. 7,295,967), the Derived Word entries are agnostic to the parts of speech for the words. Technical words that are nouns may become verbs (e.g. Google becomes googling). Verbs, nouns, and adjectives for words that are likely to be discussing the same topic are grouped together as a single entry in this dictionary.

There are many different ways to obtain Derived Words. Below are listed a few techniques that one skilled in the art might know to obtain such words. The list below is not exhaustive but should be considered as exemplary embodiments and any such other such known algorithms are possible alternate embodiments.

- Identifying misspelling of words can be done through the use of phonetic alternatives to a word (i.e. "photo", "foto"), well known letter transposition (i.e. "received", "received"), or letters near each other on a keyboard (i.e. words that should have "s" having the adjacent letter "a" or "d").
- Getting a list of all words in all the patents. Words that are not known are compared to words that are known and applying a similarity rating based on number of letters, similar letters in similar positions (i.e. + or − to the letter of a known word).
- Using a list of known prefixes to find similar base words. For example, a prefix such as "micro" can be applied to "processor" for "microprocessor", or "biology" for "microbiology". While "biology" and "microbiology"

are not in the same derived word group, misspelled forms of "biology" are applied to "microbiology". For example "biology" is an actual misspelled form of "biology" and "microbiology" was found as a misspelled form of "microbiology".

Using a list of known suffixes for words and stripping the unknown word of these to identify the root word. For example, the suffix "ed" was removed from "microassembled, and the suffix "ing" was removed from "microassembling" so that both are in the Derived Word group "microassemble".

Applying standard "stem word" algorithms to known words to identify unknown words. The well known Porter Stemming Algorithm originally written in 1979 provides an algorithm for taking a work and obtaining a "stem" word by stripping off the endings of word and adjusting the spelling (e.g. "defensible" going to "defense"). This algorithm was republished by Karen Sparck Jones and Peter Willet, 1997, Readings in Information Retrieval, San Francisco: Morgan Kaufmann, ISBN 1-55860-454-4.

In the current dictionary of Derived Words, there are over 48,000 individual groups of words. There are over 217,000 words contained in these 48,000 groups. This is significant in that when different writers use different forms of the same word, the two documents produced should still be considered related (assuming the other words in the document were also similar). By having such a large set of alternate words being identified by a single common word meaning something similar, the possibility of matching similar documents becomes more practical.

The technique to obtain a group of derived words for highly technical words was particularly effective compared to other techniques. For common words, people have observed many examples of misspellings and can easily generate a fixed list of the correct spelling of a misspelled word. In technical fields, technical words can be introduced by inventors at any time to describe new observations. Over time these words can then become more common or replaced by other words as other people agree to use a specific term.

While it is possible to present misspellings of words to a human in hopes of identifying the group of derived words where it belongs, the process can be tedious and expensive. For newer words, there may be few examples of a misspelling but it is very important that such words be in the same Derived Words group so that appropriate matching can occur. By using past history of how people misspelled a similar, more common word it is possible to catch these few misspellings of a new word.

An understandable explanation of the application of this technique is on the word "fluorocarbon". Fluorocarbons are a group of chemicals that contain both the elements Carbon and Fluorine. In the Derived Words group containing "fluorocarbon" are:

fluorcarbon
fluorocarbons
fluorocarbone
fluorocrabon
fluorcarbons
flourocarbons
flurocarbon
flurorcarbons
florocarbon
flurorocarbon
fluocarbon
flurorocarbons -continued flourocarbon
fluororcarbon
fluorocabon
fluorocarbons
florocarbons
fluourocarbon
fluoracarbon
fluorocarboned
flurorcarbon
fluorocaron All of these words are words that occur several times in United States patents dating from 1976-2010. While the example used here relied on the US patent office, any suitable collection of documents can be used to find examples of misspelled words and then these words can be used to expand the Derived Words group containing "fluorocarbon".

In the above list, the prefix to carbon ("fluoro") has been misspelled in several different ways: "floro", "fluor", "fluro" and "flour".

Applying this misspelling history to another chemical "fluoroethylene", other people have misspelled "fluoro" in a similar way. The Derived Words group for "fluoroethylene" contains the following words:

fluoroethylenes
fluorethylenes
flouroethylene
fluroethylene
fluoethylene
fluoroethlylene
fluorethylene
fluoroethlene
fluororthylene
fluoraethylene
floroethylene
fluorothylene
flourethylene While applying these learned variants of "fluoro" to "fluoroethylene" may seem to be just an isolated and trivial of something not useful in documents, there are eighty five (85) Derived Word groups that have "fluoro" as a prefix. Examples of these other groups include: "fluorography", "fluoroalcohol" "fluorosilicon", "fluorostyrene", "fluoropropylene", "fluoroorganic", and "fluorobenzonitrile". Misspelling of technical words occurs very frequently perhaps because these terms are not in many spelling dictionaries.

By using such a process such as described above, the system/algorithms can be considered as self-learning and self-adapting. The time from when a word is first understood to be useful in a search and the time for the system/algorithm to match to alternate spellings of the word can be very short.

By simple observation, it was noted that the more recent a term is and the more technical a term is, that word appears to have more alternate spellings. These alternate spelling for words, if left uncorrected, can lead to poor search/classification results.

As mentioned previously, a side effect is that these alternate spelling can lead to the false identification of these words being important "Search Words" (words that will be used as key matching words). By having two words that discussing a topic describing substantially the same thing, an unknown document can be matched to one document and not to another document.

As mentioned, one significant advantage to the above automated techniques is that there is a shortened time from the introduction of a new word to when alternate spellings or misspellings can be combined into a single Derived Word group. Another significant advantage of the above technique is that should a word be presented to a human, that person need not necessarily be an expert in the technical field associated with that specific word.

The Derived Word group for "carbonyl" contains "carbonyls", "carobnyl", and "cabronyl". A subset of the Derived Word group for "butoxycarbonyl" contains the analogous misspellings "butoxycarbnyl" and "butoxycabrnyl". Should the above example be presented to a human for verification that these alternate spellings of "butoxycabrnyl" be included in the same Derived Word group, the human might well allow such merging. The human may not be an expert in chemistry but experience in properly grouping words with similar topics would allow the person to make a reasonable allowance for this proposed Derived Word grouping.

Reinforcing the importance of doing a Derived Word group, there are many words used in the English language. While some dictionaries may have 50,000 to 250,000 words, the total number of unique words just in the US patents is over 2.5 million. Many words are misspellings, highly technical words, acronyms, words with numbers (i.e. A4 is a particular size of paper for writing/printing on), chemicals, proteins, Greek symbols from equations, mathematical terms, and words meant to represent groups of words (i.e. xDSL for ADSL, HDSL, SDSL). Many of these words are very significant when trying to find similar concepts in documents. Simply, the more common a word is, the less useful it is in matching documents because the word appears in so many different documents. Conversely, these more technical, less often used words can often times be much more useful in the searching and classification of documents.

While American English and British English (United Kingdom English) have many words that are identical, there are words that are similar in spelling but not identical. Many people will recognize that "color" is the same as the British word "colour". Other such readily recognizable words include Center/Centre, organize/organize, analog/analogue, and fiber/fibre.

An initial approach was that this was a small list that could be easily obtained from a single place on the web. It was found however that there were a great deal of words that needed to be added and the best way to achieve good results was to use the documents themselves to provide a palette of examples. Some basic rules were employed to take American English words and convert them by rule to British English words and if that British word was found in the documents a sufficient number of times AND the word was not already an American English word, the British English word was added to the Derived Word group for that American English word.

Some of the basic rules for translating between American/British words:
- -re, -er [kilometer(re), liter(re), luster(re), miter(re)]
- -ce, -se [advise(ce), license(ce)]
- -xion, -ction [connection/connexion]
- -ise, -ize (-isation, -ization) [organize(ise), realize(ise), and recognize(ise)]
- -yse, -yze [catalyze(yse), hydrolyze(yse), paralyze(yse)]
- -ogue, -og [dialog(ue), demagog(ue), pedagog(ue), monolog(ue), homolog(ue), synagog(ue)]

Besides the rules mentioned above, Wikipedia adds:

The British English doubling is required for all inflections (-ed, -ing, -er, -est) and for the noun suffixes -er and -or. Therefore, British English usage is counsellor, cruellest, modelling, quarrelled, signalling, traveller, and travelling. Americans usually use counselor, cruelest, modeling, quarreled, signaling, traveler, and traveling.

The word parallel keeps a single -l- in British English, as in American English (paralleling, unparalleled), to avoid the unappealing cluster -llell-.

Words with two vowels before a final l are also spelled with -ll- in British English before a suffix when the first vowel either acts as a consonant (equalling and initialled; in the United States, equaling or initialed), or belongs to a separate syllable (British fu●el●ling and di●alled; American fu●el●ing and di●aled).

British woollen is a further exception due to the double vowel (American: woolen). Also, wooly is accepted in American English, though woolly dominates in both systems.[87]

Endings -ize/-ise, -ism, -ist, -ish usually do not double the l in British English; for example, normalise, dualism, novelist, and devilish.

Exceptions: tranquillise; duellist, medallist, panellist, and sometimes triallist in British English.

There are many different websites that give a variety of rules, examples, and exceptions to rules. These rules can either be used to generate a static list of known words permanently added to the Derived Words list or a list of rules can be created and periodically run to identify new words that have been created that need to be added to a Derived Words group.

The Derived Word dictionary of the present invention can be distinguished from prior-art dictionaries based on the multiplicity of variation accommodated for a word entry.

Hyphenated Words

According to Wikipedia, hyphens are:

The hyphen (-) is a punctuation mark used to join words and to separate syllables of a single word. It is often confused with dashes (—, —, —), which are longer and have different uses, and with the minus sign (−) which is also longer . . . .

Hyphens are mostly used to break single words into parts, or to join ordinarily separate words into single words. Spaces should not be placed between a hyphen and either of the words it connects except when using a suspended or "hanging" hyphen (e.g. nineteenth- and twentieth-century writers).

A definitive collection of hyphenation rules does not exist; rather, different manuals of style prescribe different usage guidelines. The rules of style that apply to dashes and hyphens have evolved to support ease of reading in complex constructions; editors often accept deviations from them that will support, rather than hinder, ease of reading.

There are many different uses of hyphens in a document and it is important to identify certain specific occurrences in order to obtain superior results in document searches and classification. In some cases, hyphens are used for separating words at their syllables so that part of the word appears on one line and the second part of the word appears on another line.

In another use, Wikipedia, states:

Certain prefixes (co-, pre-, mid-, de-, non-, anti-, etc.) may or may not be hyphenated. Many long-established words, such as preamble and degrade, do not require a hyphen since the prefix is viewed as fully fused. In other cases, usage varies depending on individual or regional preference. British English tends towards hyphenation (pre-school) whereas American English tends towards omission of the hyphen (preschool). A hyphen is mandatory when a prefix is applied to a proper (capitalized) adjective (un-American, de-Stalinisation).

In yet another use for compound modifiers, Wikipedia, states:

Compound modifiers are groups of two or more words that jointly modify the meaning of another word. When a compound modifier other than an adverb-adjective combination appears before a term, the compound modifier is often hyphenated to prevent misunderstanding, such as in American football player or real-world example. Without the hyphen, there is potential confusion about whether American applies to football or player, or whether the author might perhaps be referring to a "world example" that is "real". Compound modifiers can extend to three or more words, as in ice-cream-flavored candy, and can be adverbial as well as adjectival (spine-tinglingly frightening). However, if the compound is a familiar one, it is usually unhyphenated.

Compounds that might once have been hyphenated are increasingly left with spaces or are combined into one word. In 2007, the sixth edition of the Shorter Oxford English Dictionary removed the hyphens from 16,000 entries, such as fig-leaf (now fig leaf), pot-belly (now pot belly) and pigeon-hole (now pigeonhole). The advent of the Internet and the increasing prevalence of computer technology have given rise to a subset of common nouns that may in the past have been hyphenated (e.g. "toolbar", "hyperlink", "pastebin").

As in the case of Derived Words, there are also differences in American and British usage of hyphens in words. Because of the problem of dealing with past, present, and future norms associated with words, writer's casual use of rules, and differences in American/British English, difficulties in accurately matching words in documents arise.

In the preferred embodiment of this invention, a separate dictionary is maintained for words that have, or can potentially have hyphens. In the parsing of a document for analysis, situations where the "-" is used as a negative sign associated with a number (e.g. "dropped by −0.235"), the parsing algorithm ensures that it is not confused with "by-".

In generating the words residing in the Hyphenated Words dictionary, there was heavy reliance on what occurred in source documents as well as the known rules of hyphenating words. The overall objective was to ensure that independent of how hyphenated/non-hyphenated words where used, words that were likely talking about something similar could be accurately matched. This was accomplished by establishing a single common form of a word.

Certain words that were based on hyphenating the word for purposes of fitting words on a page can be identified during the parsing of the document. If the two parts of a hyphenated word in the document is identified as a common word when the hyphen is removed, the common word is substituted for the hyphenated word. (e.g. pre-school)

To identify the many different types of uses authors employ with the "-", a scan of millions of documents was done. Every usage was logged. Occurrences of the hyphen showed up in many ways such as hyphenating three words, acronyms, spelling individual words (e.g. W-O-R-D to emphasize that the sequence of letters was used that makes up WORD), drawing using hyphens, pauses in sentences, used for underlining the words above the hyphen, etc.

For hyphenated words that consist of two words, there may be three different ways writers choose to write it. For example, real-time is written as a hyphenated word, two different words (i.e. real time) or as a single combined word (i.e. realtime). For the preferred embodiment, only the single word or two separate word option is employed to create one common form of a hyphenated word. The decision to use the single or two word form is based on several factors. For some words, the most prevalent form (single combined word or two separate words) is chosen. Since the total occurrences for each form was obtained by examining an extensive database of documents, the decision can be simply the greater numerical value for the occurrence.

In other cases, the decision to choose single/two word form is based on the overall interaction with other words in other dictionaries. For example, acronyms may use the single or two word form of the word and thus have an effect on the choice.

The Hyphenated Word dictionary is not limited to just two words. Three or four word combinations are possible. Seldom should three or four words be combined into a single word but it is not always clear that they should be three/four separate words. At times, three words can have two words joined together (word1-word2-word3 become word1word2 and word3 is separated). Alternatively, word1-word2-word3 become word1 is separated from word2word3. The decision how to make a common form is again based on the number of occurrences for each option from a reference set of documents, interaction with other dictionaries, or just a random assignment. The preferred embodiment is the intelligent choice between the first two options.

As was mentioned, one author may choose to use hyphens for some words while another chooses to use the single word form. When analyzing documents with words that can contain words without hyphens and/or joined words (two words as one word) and can be any combination of three or four word hyphenated words, there are many combinations. Some of these words may have hyphens at syllables for formatting purposes. The once simple problem of identifying hyphenated words becomes much more complex.

Currently, there are over 51,000 word groups in the Hyphenated Word dictionary. Members of a group consist of the hyphenated word, single word, two word/three word/four word form. The word "ferromagnet" is the preferred form of the word since "ferromagnet" occurs 196,942 times in the documents scanned verses "ferro-magnetic" (2,579 times) and "ferro magnetic" (245 times).

Not always does the highest occurrence determine which form of the word is selected. The hyphenated word "follow-on" occurs 1,927 times but the single word form "followon" is used which only occurs nine times while the two word form "follow on" occurs 956 times. The plural form of the hyphenated word "follow-ons" also occurs in the documents and these two words need to be grouped together in the Derived Words dictionary and only single words are used in that dictionary. Since matching is the important aspect, the internal usage of which form is used becomes a secondary consideration. This is especially true when there are many misspellings of a word to be considered.

Phrases/Acronyms/Acronym Phrases

Phrases are a group of words that taken together connote a specific meaning. Phrases can be just a just a collection of words or phrases that often used may be replaced by an acronym representing the collection of words for that phrase.

According to the Merriam Webster 11th edition, the definition of acronym is:

"a word (as NATO, radar, or laser) formed from the initial letter or letters of each of the successive parts or major parts of a compound term; also: an abbreviation (as FBI) formed from initial letters."

Acronyms were found to be very important in obtaining good search results if processed properly and poor results were obtained if the meaning of the acronym was not matched. Part of the usefulness of an acronym is that it substitutes for several different words. Conceptually, matching three or four words representing a single idea might indicate that two documents are discussing the same topic. Since many acronyms become associated with a specific technology (e.g. "CRT" means a TV or computer screen), it narrows the scope of a topic in a document.

While the primary context of phrases used in the description of this invention is associated with an acronym, phrases without acronyms are processed in a manor analogous to the processing of acronym phrases. Phrases without acronyms are part of the preferred embodiments of the invention.

As usual, processing acronyms is not as simple or uniform as one might initially expect. As a way of discussing acronyms, the combination of letters comprising the acronym will be called a "bare acronym" (e.g. CRT) and the collection of words that represent the letters in the acronym (e.g. Cathode Ray Tube) will be called an "acronym phrase". If the specific form of an acronym is known, the term used is "qualified acronym" (i.e. CRT is known to be Cathode Ray Tube and not a different acronym phrase such as Cellular Radio Telephone).

Below is a list of some of the most common problems found in processing acronyms. By overcoming these specific problems, significant improvement in document search/classification results were obtained.

1. Bare Acronyms

One complication of acronyms is that a "bare acronym" can be used by people to mean two different things. The bare acronym ABS can mean "Antilock Braking System" referring to brakes on a car but ABS can also mean "Alternate Billing Services", "Automatic Brightness System", "Air Bearing Surface" and several more things. Therefore when matching ABS, search results can be good if both documents understand ABS to mean brakes on cars, but matching results are poor if one document means brakes and the other means "Automatic Brightness System" as might be applied to television screens.

If every writer defined their bare acronym with the accompanying acronym phrase and the acronym consisted of the first letter of each word, the process of matching acronyms would be fairly simple. For unusual or seldom used acronyms, many writers do define the acronym phrase associated with the bare acronym but based upon observation, writers well qualified in particular technical areas make the assumption that some acronyms are so well known, they need not define them. Unfortunately, another writer in another technical area may feel that the same bare acronym is so well known that it does not need to be defined. One example is "CTS". Well known in modem communication, CTS relates to a specific line on a telephone modem, "Clear to Send" and often is not defined. In the automotive industry, CTS can mean "Coolant Temperature Sensor" and again is at times not defined.

2. Same Acronym, Different Phrases

Even when an acronym is defined, it may not be the exact same phrase as another writer has used. OTEC is most commonly known as "Ocean Thermal Energy Conversion" but has alternate acronym phrases such as:
Ocean Thermal Energy Conversions
Ocean Terminal Energy Convention
Ocean Thermal Exchange Cycle It's not really significant which writer is correct, the reality in dealing with documents is that these variants are possible and must be accommodated in the processing algorithms to obtain the desired results.

3. Many Variations

Figure 16:
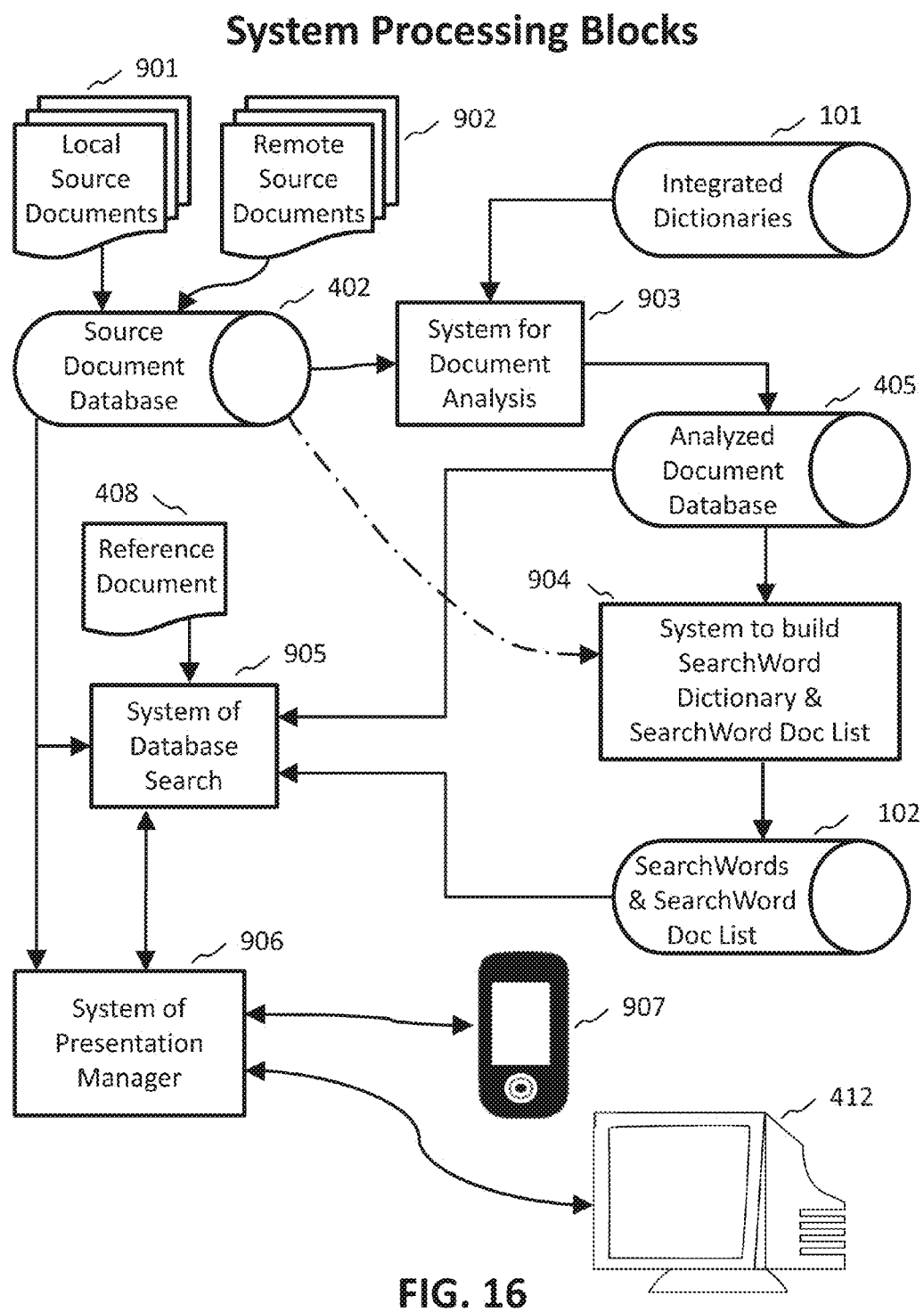
FIG. 16 is a block diagram of an example of the system processing blocks used in document search/classification.

Acronyms associated with chemical names perhaps have the largest number of variant acronym phrases. TBA can be:
Tertiary Butyl Alcohol
t butyl alcohol
t butyl alcohols
tert butyl alcohol
tert butyl alcohols
tertio butyl alcohol
tertiary buty alcohol
tertiary bull alcohol
ter butyl alcohol When scanning a document, it is not easy to identify the meaning of an acronym. The acronym "mRNA" has the associated phrase "messenger ribo nucleic acid". In the text of documents, writers describe the acronym as:
  a. "FIG. 16 shows the nucleic acid (mRNA)" [the text fails to mention "messenger"]
  b. "... murine RTP nucleic acid (mRNA)" almost implies that is the definition of mRNA."
  c. The primary definition is "messenger RNA nucleic acid" or "messenger ribo nucleic acid"
The acronym (IgG):
  d. Immunoglobulin G (IgG)
  e. Or IGG could be "inert gas generator", "inert gas generators", "initial gas gauge", 4. Variable Placement of Spaces Chemical names can have the spaces between words omitted.
  f. TEPA="Tetra Ethylene Penta Amine" but is also written "tetraethylene pentamine", or "tetra ethylene pentamine"

5. Acronyms can have the Same Bare Acronym but Similar Meaning Acronym Phrases
  g. SBAS=Space Based Augmentation System & SBAS=Satellite Based Augmentation System 6. Acronyms can have a Similar Meaning but Different Bare Acronyms.
  h. Reorder words: SNIR—signal noise interference ratio, SINR—signal interference noise ratio
  i. POS—point of sale, point of sales, points of sale 7. The Bare Acronyms May not Take the First Letter from Each Word in the Acronym Phrase
  j. MSCC—Millisecond Catalytic Cracking
  k. MEMS—Micro Electromechanical Mirrors
  l. EBEAM—Electron Beam
  m. ECC—"Error Check/Correct Circuit" and "Error Detection/Correction Code"

8. The First Words of Short Phrase May be the Same as the Starting Words of a Longer Phrase A three word acronym may have the same three initial words as a four word acronym. For example:
  BSC—Boundary Scan Cell and BSCC—Boundary Scan Cell Circuits
  PCS—Personal Communication System and PCSC—Personal Communication System Switching Center In general, the longest possible phrase should be matched and the phrase matching process should not be abandoned after the first match (e.g. three words) is obtained.

9. Words in an Acronym Phrase May be Transposed

Writers may transpose words in acronym phrases. For example, TIFF can be:

Tag Image File Format
Tagged Image Format File

10. Words are Added to Phrase that are not in the Bare Acronym

Sometimes writers add words to the acronym phrase and the first letters of these words are not included in the bare Acronym.

DAC—Digital to Analog Converter [DAC does not include the letter "t" from the word "to"]
ECC—Error Checking and Correction
ICAM—Interdisciplinary Center for Applied Mathematics Sometimes these extra words are required to be in the phrase.

BTO—Build To Order
AWACS—Airborne Warning And Control System
DFM—Design For Manufacturing The following list of words ("Phrase Words Optionally Excluded") were found to be added to a phrase by some writers and not added under other circumstances (i.e. extraneous). At times these words are required to be part of the acronym phrase.

"to", "and", "a", "the", "plus", "of", "in", "or", "for", "as", "by", "with", "at", "but", "is", "on"

Writers may just use the acronym phrases without ever using the acronym. It is still important that these series of words still be associated with other documents where either the proper acronym or documents with variants of the same acronym phrase are somehow allowed to be matched. Recall also the possibility that some words of the acronym phrases may be misspelled, phrases may contain American English or British English words, and words may contain hyphens between syllables or between words.

Because of the superior results that acronyms provide in document search and classification, the effort to recognize and match the variations used by writers is a worthwhile endeavor. While not yet complete, the current dictionary of acronyms have over 30,000 separate acronyms identified and many have a large number of alternate acronym phrases for the same acronym. Described below is the preferred embodiment for effectively processing the acronym phrases of the present invention.

Documents are analyzed to identify the presence of phrases through a series of steps. While the description below is presented in a sequential manner, it is possible that processing of phrases need not be done in the specified sequence or that all the steps must be performed as described. Alternate embodiments would include combining steps, reduce the quality of the processing (e.g. not sorting, limiting the types of corrections to words), or reordering the steps.

- Identify individual words. For example: remove groups of characters that are purely numbers; process the apostrophe (') for possessive & plural possessive; process the ampersand (&).
- Process the word for hyphens or being a Hyphenated Word/Phrase. A word can contain hyphens at syllables; two words in the document should be treated as a single word (see hyphenated word description above); one word should be treated as two words (see hyphenated word description above);
- If the word is in the Derived Word dictionary, use the representative word associated with that Derived Word entry. Using the Derived Word dictionary allows misspelled words to be corrected, accommodates variations between American English and British English, and eliminates variations in the word form (e.g. plural, past tense, future tense).
- Identify if the word is the starting word of a phrase (or one of the words in the current phrase being processed). If two or more words have been identified, the words are sorted (e.g. alphabetically), combined (without using the space between words) and then compared to known phrases.
- As was indicated, writers may rearrange the words in the phrase. By always having a fixed order for comparing, the error of transposing words is eliminated. Also, chemical terms and other words are often written as separate words or combined together (without spaces). By comparing the document phrase with the list of known phrases without worrying about the placement of spaces, increases the phrase matching accuracy.
- The phrases are compared first with all words extracted from the document for the phrase and then the phrase is compared after certain words (i.e. "Phrase Words Optionally Excluded") are eliminated from the incoming phrase (if present).
- After no more words are added to the existing phrase, the longest possible phrase match (if a match occurred) is processed. A single, unique word is substituted for the string of words used in the document. This single word may often be the primary phrase associated with the qualified acronym (without spaces between the words of the phrase).

The above list of steps is meant to give a general idea of how phrases are processed. Steps in a method embodiment of the invention are explained in detail in the following sections.

While the above list of steps looks like it occurs sequentially, the sequence of processing is not significant to the teachings of the invention. The complete process of taking a bare acronym to a qualified acronym in the preferred embodiment is more complex. Because the capitalization of the letters in the acronym may provide a clue to the writer's intended meaning and other words in the document may help assist in the selection of a qualified acronym. Using a layered approach in processing free-form text enhances the accuracy of the results in acronym processing.

Inferring the Meaning of a Bare Acronym

The ability of the system to infer the meaning of bare acronyms (i.e. making them qualified acronyms) is a powerful enhancement (and alternate embodiment) to the present invention. While not required in the preferred embodiment, the acronym dictionary also contains additional information associated with acronym entries. This information consists of words that are often present when this qualified acronym is present in a document. This additional information is used in the document processing algorithm to identifying which form of an acronym is being used in the current document.

As was mentioned, authors may not always define an acronym in a document particularly when the author believes it is fairly well known in that particular field. There are a large number of acronyms that have the same bare acronyms but have different phrases/meanings associated with each bare acronym. To overcome this problem, documents that have the acronym phrase defined can be processed to identify words that are commonly present when that qualified acronym is used. The collection of words and the statistical importance (e.g. the ratio of times the word occurs when the qualified acronym is present) linking the qualified acronym with each associated word can be included with the acronym entry in the Acronym dictionary.

For example, among three of the seven definitions of the bare acronym AAA are "Abdominal Aortic Aneurysm", "Adaptive Antenna Array" and "Authentication Authorization Accounting". Some of words that often occur in documents containing "AAA" and can be used to identify which of the phrases are being used are: "antenna", "blood", "patient", "service", "server", "request", "network", "aneurism", "body", "send", "internet", "message", "interference", "power", "vessel", "array", and "IP".

In one exemplary and non limiting method to obtain the list of words that can distinguish between the same bare acronyms, a collection of documents is processed as described by the present invention. The documents containing the various forms of each bare acronym (where the acronym was defined in the document) are put into groups based on having the same qualified acronym of the bare acronym. The words that are statistically important to that qualified acronym and that are most different between qualified acronyms are selected. The selected words are then examined to ensure that some subset of the words is highly likely to be present in each document where the acronym is also present.

The following steps represent an example of a method in accord with an embodiment of the invention:

1. Identify a bare acronym that has at least two separate qualified acronyms that have different meanings (e.g. variant $V_1$ and $V_2$).
2. Scan the documents that are used for learning (e.g. all US patents). For each document that has the specified bare acronym and only one of the qualified acronyms (or the phrase associated with the qualified acronym) present, increment the number of times ($N_x$) each word ($W_x$) occurs for that qualified acronym.

It is possible for an acronym to have two different meanings and appear in the same document. The acronym VMS has one meaning as Voice Mail System (or Voice Mail Server) and another as Voice Mail Service. In U.S. Pat. No. 7,471,674 both the phrase "voice mail service" and "voicemail server" are present. Having two different qualified acronyms of the same bare acronym (or their phrases) present in the same document is not a rare occurrence. For the two different variants of VMS, there are 864 US patents that have both.

Nor is VMS alone in having multiple acronyms in the same document. Currently there are at least 2,700 pairs of qualified acronyms (each pair having the same bare acronym) in the US patent database that have at least one patent in which they both occur.
3. For each word, calculate the ratio ($R_v$) of the number of documents word $W_x$ occurs with the qualified acronym (or phrase). $R_{1x}=N_x \div N_1$ (where $N_1$ is the number of documents that contain qualified acronym $V_1$.
4. If $R_{1x}$ is less than 10% for any $W_x$, ignore the word since it does not occur frequently enough with that $V_1$ to be considered significant.
5. Using the list of words remaining from step 4, remove words that are in more than one qualified acronym ($V_x$).
6. Using the words remaining from step 5, sort the words according to $R_{1x}$ starting with the highest value.
7. In this preferred embodiment, there should be 7 words in each document that are usually found with qualified acronym ($V_x$). Since few of the words from step 6 are always present, a list of words (greater than 7) must be created to ensure that at least 7 are usually present. To do this, rescan all the documents and for each document, go sequentially through the list and increment the count ($N_x$) for each word ($W_x$) until exactly 7 words have been found in that document.

The purpose of this step is to identify the minimum number of words that must be kept to identify an acronym using just the words in the document should the acronym phrase not be present. Since only 7 unique words are required to ensure proper identification (they rarely occur with the other qualified acronym), it is only necessary to keep enough words until at least 7 words are present in any document.

Also, for each document, sum up the ratio values (e.g. $R_{1x}$) for all seven words (if seven words present) and divide by the number of words to obtain the average ratio. Sum up all these ratios and divide by the number of documents containing this qualified acronym. This Average Score Value will be used later to identify when a bare acronym can be considered a valid qualified acronym.
8. The final list of words associated with acronym $V_1$ is then those words that have a non-zero count ($N_x$). Both the word and the ratio for that word ($R_{1x}$) are kept in the Master Dictionary (or in an alternate dictionary in an alternate embodiment). The words are arranged in order starting with the highest $R_{1x}$. This word list is called the Acronym Qualifying Word List and is obviously unique for each acronym (if there is more than one qualified acronym for a bare acronym). Acronyms having only one qualified acronym for a bare acronym do not require an Acronym Qualifying Word List.

Words that have a non-zero count value (i.e. $N_x$) are required in at least one document so that at least 7 words are present. For some $R_{1x}$ acronyms, the list of words to ensure 7 words are present can be small (only 12 words). In other acronyms, it may take 60 words to ensure that among them, there are always 7 words in the training documents (e.g. the US patent database).

During the document processing step of identifying significant words/acronyms that are present, the algorithm to assign an identity to an acronym that is not defined in the document is as follows:

1. Create the list of words present in the document as explained in the section "The Methods of the Invention—Analysis of Documents".
2. For each undefined (bare) acronym in the document that can have more than one meaning, use the following preferred algorithm to try to determine its meaning:
   a) Get the list of words known to be associated with each qualified acronym for that bare acronym.
   b) Using the Acronym Qualifying Word List, start at the first word (recall they are arranged in order of importance). If the word from the Acronym Qualifying Word List is also present in the document, add the value from Acronym Qualifying Word List for that word (e.g. $R_{1x}$) to the sum value for that acronym variant. Do this until seven words are found in the document or there are no more words in the Acronym Qualifying Word List.
   c) Compute a score for that acronym variant ($S_x$). Take the sum value from step b and dividing by the number of words from the Acronym Qualifying Word List found in this document (e.g. 7). Divide this value by the Average Score Value for this acronym variant. This step is essentially a percentage value indicating how well this selected set of words matches the set of words surrounding this acronym variant in the training documents (e.g. US patent database).

This step is necessary since it is not the absolute value of the individual word scores that is important but how well the word sets match each other. In some acronyms with very long word sets, the ratios become very small and in others with small word sets, the ratios are fairly large.

On the other hand, if only the last few words from a large word set were being found, the sum of the ratios would be small and it is likely that the average set of words would have a far higher score. For this reason, unless the acronym variant reaches a match of 75% of the Average Score Value, it is not considered to be an acceptable match and discard.

d) If only one of acronym variants reaches an Average Score Value of 75%, then that acronym variant is considered the winner and the bare acronym is treated as if the qualified acronym has been found. Should more than one acronym variant achieve an Average Score Value of at least 75% no acronym variants achieve an Average Score Value of 75%, then the bare acronym is assumed not to have been identified and remains a bare acronym in the remaining steps of document processing.

The above selection for words normally found with an acronym works fairly well across a fairly large number of acronyms. It does particularly well when the variants of the same bare acronym are from different fields of study and do not contain any of the same words as the other acronym variants being analyzed. When the acronyms share the same field of study and/or share some common words in the phrase, the word selection algorithm is not as robust. An enhancement to the word selection algorithm in an alternate algorithm is possible.

In this alternate embodiment, the words unique across all of acronym variants of the same bare acronym are identified using the previous algorithm. In addition though, words are added to the selected word list that help distinguish between the acronyms that have similar words. In other words, instead of selecting words that are good across all 10 variants of an acronym, words are selected that help distinguish between each possible acronym pair.

In the above example of VMS which could mean "voice mail service" or "voicemail server", "voice" and "mail" are not able to be used in distinguishing these two acronym variants but useful when used to distinguish either of these with "Vehicle Management System" or "Virtual Machine System". In the last two, "system" can't be used but "system" is useful when comparing between "voice mail service" and "voicemail server" since "system" is often used in documents describing the "voicemail server".

In this alternate embodiment up to three extra words are added to the base 7 words for each acronym pair combination that did not get a sufficient word list using globally unique word sets.

Other alternate embodiments are also possible and those skilled in the art can apply other algorithms that generate appropriate word sets and scoring algorithms that can be used to distinguish between acronym variants.

Word Capitalization Dictionary

Capitalization of words/acronyms in documents can sometimes provide clues to what a word may be. Sometimes no particular meaning can be ascribed to having the first letter of a word capitalized when it is the starting word of a sentence but sometimes a capitalized first letter can be a chemical element (i.e. Zn for zinc). At times, the entire word capitalized can mean it's an acronym and sometimes all the words of a sentence/phrase are capitalized because it is a title or the writer may use that to show emphasis.

Many prior-art algorithms exist that can parse a document to identify sentences, extract words in those sentences, and do rudimentary identification of abbreviations. In U.S. Pat. No. 4,773,009, Kucera et al. describe a method to identify a paragraph, sentence, punctuations marks, and find word boundaries according to the generally recognized rules outlined in the "Chicago Manual of Style". An embodiment of the invention also employs a dictionary allowing for the recognition of six hundred "statistically significant abbreviations".

To aid in properly understanding the usage of words, the preferred embodiment utilizes a Word Capitalization dictionary. It has been observed that writers have a broad spectrum of styles when capitalizing (or not capitalizing) words and the algorithms that can decode the intent of the writer will produce superior results. Listed below are some of the challenges of creating a consistent environment which will then allow proper matching of documents created by different writers.

If all (majority) of the words of a sentence/phrase are capitalized, capitalization may not be significant.

If the first letter of each word in the sentence/phrase is capitalized, capitalization may not be significant (excluding words such as "of", "the", "in", "and", etc.)

If the word is listed in the Word Capitalization dictionary and matches the capitalization in the dictionary, the capitalized form has significance (i.e. a chemical element)

Certain words when capitalized may be an acronym (these words are listed in the Acronym Dictionary).

Certain words may be either a regular word or the writer may be meaning them as an acronym.

Bold with its ordinary meaning and BOLD the acronym meaning "Blood Oxygenation Level Dependent"

Olga (a person's name) or OLGA—Organic Land Grid Array

Many acronyms become so common, they are not capitalized (e.g. CRT, crt) and, if there is no "regular word" with a meaning, it may be treated as an acronym. (Especially if the acronym phrase for that acronym is found in the document.

Acronyms may also be used in a document with its:

plural form; (e.g. CMTS—Cable Modem Termination System) can be plural

"Several CMTSs can be combined into a single enclosure to create a system."

possessive form;

"The CMTS's modulator is connected to the coaxial cable."

plural possessive form;

"The CMTSs' power supply in the enclosure is connected to the 48 volt battery."

A word can possibly be:

a "regular word" (e.g. boss, boss's), the plural form of an acronym (e.g. BOSs as in the acronym BOS—Back Office System)

an acronym (e.g. BOSS—Binary Oriented Set Sequencing)

Sometimes, the capitalization of a word/acronym can help distinguish between two distinct bare acronyms (those without a definition).

AGI—Adjusted Gross Income

AgI—Silver Iodine (Ag is the symbol for the chemical element Silver, I is the symbol for the chemical element Iodine)

CSOC—Convolutional Self Orthogonal Code

CsoC—Configurable System On Chip

The purpose then of the Word Capitalization dictionary is an aid in identifying whether the capitalization of a word should be considered significant. When there is an acronym that can also be a "regular word", the Acronym (and in the preferred embodiment its plural form) should have an entry in the Capitalization Dictionary. It is also useful (but not required) that Chemical elements and/or chemical compounds be also incorporated in this dictionary.

The purpose of other entries in the Word Capitalization dictionary is for when a specific capitalization form of an acronym provides a significant clue as to its intended meaning. In the above example, enough writers used the "CsoC" capitalization form of the acronym to mean "Configurable System on Chip" that when this acronym is encountered in a document (and its acronym phrase was not specified), there is a high probability that the phrase "Configurable System on Chip" was what the writer intended.

Stated another way, an entry in the Word Capitalization dictionary is created to assist in the process of taking a "bare acronym" to a "qualified acronym". This is done when enough statistical information is available to support that linking the specific capitalization form of a "bare acronym" to a specific "qualified acronym". As in many other situations, there is a tremendous variation in documents and writers take great liberties with established rules (e.g. upon first usage of an acronym, the acronym should be defined). Because of this high variability, ambiguities of the meaning of two bare acronyms may not always be reliably resolved by the capitalization form found in the document. It is merely one of the layers of processing that ultimately provides superior document searching/classification results.

Distinction Over Prior-Art Dictionaries

The use of dictionaries to assist in the processing of text documents is well known. There are two points to this distinction that represent improvement on these prior art approaches, the extent of variations accommodated in the inventive dictionaries and the reliance on using multiple dictionaries in an integrated fashion to more accurately understand the writer's meaning for a word.

While the Dale-Chall list of three thousand base words provides for creating an entry of variation of "worked", "working", "works" for "work", it does not attempt to provide alternatives for British English vs. American English variations (e.g. fibre vs. fiber), misspelling correction (e.g. fiberss), "made-up" words (e.g. fiberized) or words that are probably discussing something similar (e.g. fibersize) or do not share the same stem word (e.g. improper vs. unproper).

In U.S. Pat. No. 4,773,009, Kucera et al., states that the invention built upon Dale-Chall:

"First, however, words not found in the Dale-Chall or exception lists are checked at stage 174 to identify abbreviations, acronyms, and proper nouns for special processing."

The novel teachings of the integrated dictionaries allow for the fact that words can be both "regular words" and acronyms. Kucera might find "oat" (or oats) in Dale-Chall and therefore not process the word as an acronym. The present invention finds that "OATs" and "OATS" in the Word Capitalization dictionary and understands that the capitalization for these words provides guidance that the original capitalization should be checked and perhaps processed as the Acronym "OAT" if the original form was "OATs". The word "oats" could perhaps be processed as a different acronym (i.e. OATS) if the original capitalization was "OATS", or perhaps processed as the grain "oats" if the capitalization was "Oats" or "OATS" (if "OATS" part of a phrase that was entirely capitalized).

It has been previously mentioned that "OATs" could perhaps be processed as an acronym because of the intelligent nature of the Acronym dictionary. The present invention is aware of other words in the document and is able to discern that "OATs" could mean "Outside Air Temperature" if that phrase was found in the document. "OATs" could also be inferred to mean "Outside Air Temperature" even without the phrase being specifically present because of the other words in the document that are associated with this technology (e.g. pressure, ambient, day, night).

As was shown in various examples, capitalization of a word is not a perfect indicator of an acronym, plurals of words and acronyms may be the same spelling, misspelling of a word may/may not be an acronym or a new technical term. Hyphenated words may be syllables, two words that should be treated as one (stand alone or within an acronym phrase), or one word that should be split into two words (stand alone or within an acronym phrase).

Prior art Dale-Chall lists of words (and many other lists containing a small number of words) teach away from an important aspect of the present invention. The most common words may not be as important as other words for purposes of matching and classify documents since the most common words appear in the majority of documents. More unique words, for example qualified acronyms, are more important because they tend to be more specific to the central content of the document. As will be discussed later, the algorithm to provide an importance value associated with a word will give preference to words that span fewer classifications of documents and give lower importance to those words that appear in the majority of classifications.

The use of a layered approach to processing words aided by dictionaries overcomes ambiguities present when using a single dictionary.

In U.S. Pat. No. 7,136,876 filed in 2003, Adar et al. disclose a technique for processing abbreviations which they define as a superset of acronyms. Typical of other prior-art patents, their processing of acronyms in documents have several restrictions overcome by the present invention.

They require an acronym to have at least one capital character (Col 4:16-20). An acronym in the present invention does not require any letters of an acronym to be capitalized before it is recognized as explained above.

They indicated that stop words such as "of" and "to" (col 6: 31-32) need an alternate embodiment whereas all words are allowed and the normal stop words are processed correctly. (see above discussion of "Phrase Words Optionally Excluded".)

They indicated heavy reliance on the use of the parenthesis and bonus point awarded if a word was near it and decreased the score if it was not. (col 6: 9-12). The present invention is not concerned with the presence or absence of the parenthesis.

If the definition of an acronym is not in the text, the algorithm cannot provide identification of its meaning. For many technical documents, the most used acronyms are frequently not defined. The present invention overcomes this limitation and understands the other words in the document that can distinguish between identical acronyms.

Adar does not deal with phrases having various word forms (e.g. past/future tense, "made-up" words), misspelled words, or difference between American and British English.

Building the Dictionaries

Figure 2:
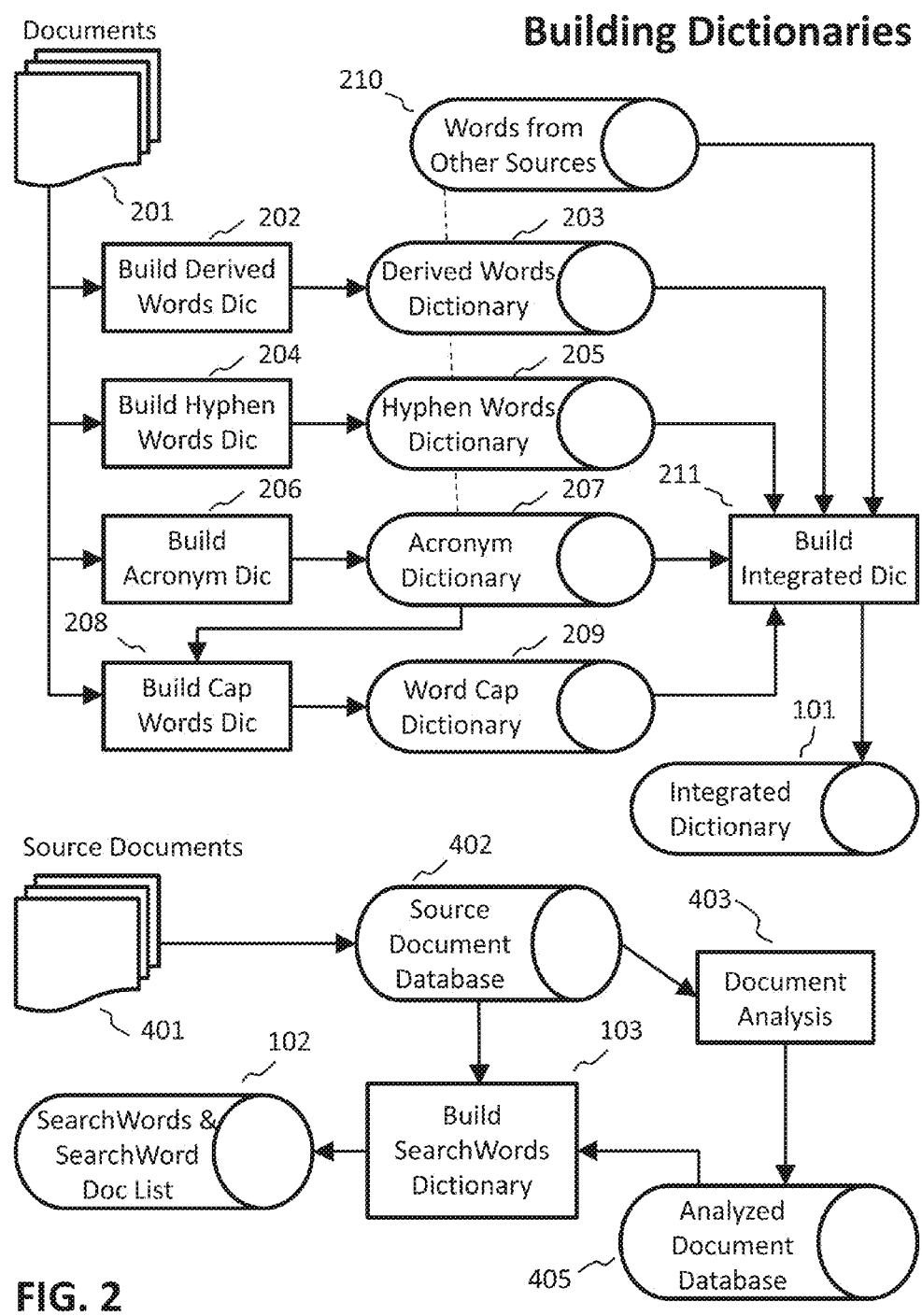
FIG. 2 is a block diagram of an example of main processing blocks used for building the dictionaries.

The various dictionaries described above can be created in a variety of ways. Existing lists of words that cover some of the basic ideas of the above dictionaries are readily available but may not meet the overall quality possible for superior search/classifications results. The algorithms along with very broad coverage of words combine to allow much more useful results than existing systems. Shown in FIG. 2 are the basic functional blocks used in building the dictionaries.

Words learned by the system that become part of the Integrated Dictionary (101) can be from many different sources. The wider the diversity of the types of documents (201), the better and more reliable will be the dictionary. Documents with spelling errors, formal dictionaries, and writers with English as a second language are useful because they provide examples of the documents a system should be expected to handle.

It is possible and desirable to have the database of documents used for the document search/classification (401) as part of the dictionary building process but there is no requirement that the sets of documents (201 & 401) be the included.

Building the Derived Words dictionary (202) needs several different types of algorithms since it accommodates many possible variations of a word. Many of the variations for a Derived Word entry were previously discussed and then scanning of the documents (201) to discover those variations will provide the words to be linked together and stored in the Derived Words Dictionary (203).

Building of the Hyphen Words dictionary (204) requires scanning of the documents (201) and matching up occurrences of words with hyphens, the single word containing both words of the hyphen, and the two words next to each other comprising the hyphen. A count is kept as to which form is the most common and that may be the form used to create the common word that replaces the single/hyphen/two words when found in documents. If a derived word is being used for a hyphenated word, the single word form of the hyphenated word is used otherwise the most common form of the hyphenated word is used. The results from that processing are stored in the Hyphenated Words Dictionary (205).

Building the Acronym dictionary (206) requires the ability to find bare acronyms (upper and lower case), plurals of the bare acronym, and the phrases associated with the bare acronym so that the qualified acronym can be constructed. After the acronym and phrase are known, another scan of the documents is done to identify the other words commonly found in the document for a qualified acronym. The combined information for the acronyms is preferably stored in the Acronym Dictionary (207).

Building the Word Capitalization dictionary (208) is done by obtaining information from the documents (201) about each word's capitalization. As was discussed previously, chemical elements, acronyms that are upper case only or mixed upper/lower case are some of the words that can be included in the Word Capitalization dictionary (209). Conflicting entries in the Derived Words, Hyphenated Words and Acronym dictionary may also need to have an entry in this dictionary. Words such "boss" can be confused with the acronym "BOSS" or the plural of "BOS", "BOSs" and can be distinguished by the proper combination of upper case/lower case letters.

Building the Integrated Dictionary (211) is done by combining the Derived Words, Hyphenated Words, Acronym, and Word Capitalization dictionary. Besides obtaining words from the documents, true synonyms, misspelling lists, or sources of words generated by others (210) can be incorporated into 101. When processing acronym phrases, the phrase used in the document (201) is simplified using the word representing the entry for the word in the Derived Words dictionary should that word exist. By using the normalized form of the word, better matching of phrases is obtained.

The bare acronym is also extended to allow for its plural or possessive case. This is done for example by adding a lower case "s" to the acronym. To ensure that this word is unique, it is checked for a conflict with words in the other dictionaries and allowed into the Integrated Dictionary if no conflicts are present. If the plural form conflicts with another word (e.g. Acronym), then the capitalization of the proposed plural acronym is compared with the existing word entry. If the word can be distinguished by its word capitulation, it is entered into the Word Capitalization dictionary.

Conflicts of words between the dictionaries are also resolved such that one word is not replaced by a second word only to have that undone by a different dictionary. The Integrated Dictionary (101) is then used for the document search/classification functions.

Building of the SearchWords dictionary and the Search-Words document list is done by block 103. Words to be used in performing document search/classification can come from either the Source Documents (401) or from one or more of the dictionaries (i.e. 203, 205,207, or 209). The algorithm for calculating the word importance for the word is discussed above and uses the information from the Analyzed Document Database (405) which was created (403) from the Source Document Database (402).

After those SearchWords have been selected and the importance value has been calculated, the building algorithm calculates the low/median/high statistics WordRatio information which is discussed below. This requires that the Analyzed Document Database be accessed to find the information across all of the documents. An entry in the SearchWord file containing the statistics information, and importance value is created for each SearchWord.

In the preferred embodiment, there is also a file created for each SearchWord that contains the document identifier for every Source Document (401) that includes that word. This information is used in the Database Search function to allow faster processing when doing document search/classification. All this information is stored in the SearchWords and Search-Word Document List dictionary (102).

Alternate Embodiment Dictionaries

The above list of dictionaries provides a good base of words for analyzing and classifying documents. In alternate embodiments of this invention, additional dictionaries are possible. Some dictionaries may be present and used for all documents, some dictionaries can be invoked depending on the type of document, the subject of the document, or if specialized processing is desired such that only limited aspects of the document are desired to be processed.

In yet another alternate embodiment, words in some or all of the dictionaries can be enhanced for usage (given greater probability weight when trying to discern the writer's meaning) depending on the type of document, the subject of the document, or if specialized processing is desired such that only limited aspects of the document are desired to be processed.

Additional dictionaries such as Excluded Words, Included Words, Search Words, specialized topic dictionaries (e.g. acronyms for chemistry/biology/finance/legal/military, misspelled words in documents related to chemistry/biology/finance/legal/military, hyphenated words for chemistry/biology/finance/legal/military) are contemplated and within the scope of the novel teachings of the present invention.

An Excluded Word dictionary can be useful to prevent words that might not aid in document search/classification from entering into the processing steps of the document, searching, or classification. For example, cities, countries, first names, or last names could cause a bias for those documents where people/company names, addresses, or location would not enhance the search/classification results. For example, "chuck" could be al alternate form of "Charlie" or "Charles" but it could also be a drill "chuck" used in tools or milling technologies. Without intelligent processing, of the document, the search/classification results may be degraded by the inclusion of the results. Sometimes names like "Planck" or "Boltzmann" are very relevant to a document because they may be related to a particular subject matter. "Plank's constant" is used in physics and used in discussing photons (light waves) and "Boltzmann's constant" is related to an energy (temperature) of a particle.

An Included Word dictionary may also be useful for forcing words to be processed that might otherwise be excluded or not processed. In the telecommunications field, a "T1" or "T3" ("T-1"/"T-3") are well known as communication links that can carry 24 or 672 voice channels respectively. Some processing algorithms may exclude words with numbers and thus exclude very useful groups of specialized words that may be related to the topic of the document being processed. Other words that might be part of Included Word dictionary is "K9" which can be related to dogs (i.e. police K9 units), the useful lubricating oil "WD40" (WD-40), or a particular size of paper to print on (the "A4"/"A-4" size).

A Search Words dictionary might define only the words to process. This dictionary might be the exclusive list of words of words used for search/classification and all the other need not be processed. While the preferred embodiment has a Search Words dictionary, processing of the words is not restricted to just these words. As will be discussed, in trying to understand the intended meaning of "bare acronyms" (those without the acronym phrase in the document), the presence of specific words known to associated with that form of the bare acronym provides the requisite information to infer the intended meaning of the bare acronym.

Other dictionaries (or algorithms that produce similar results), such as those that can help in identifying the parts of speech, (e.g. noun, verb) are useful, alternate embodiments. Indeed, the use of alternate dictionaries for a broad spectrum of linguistic purposes should be considered as alternate embodiments and limited only by its permissible scope.

The Methods of the Invention

Analysis of Documents

In the analysis of documents for the present invention, there are several key aspects. In a number of processing steps for document search/classification, it useful to provide some type of normalization of parameters based on the size of a document. Another aspect of processing documents is the concept that some words are more important in the process of document search/classification than other words. These words are collectively known as Search Words.

WordRatio

When processing documents, it is sometimes useful to know the size of document. For example, if a word is in a document once and the document is large, the document may not be discussing the topic associated with the word in any great detail but may be just anecdotally being mentioned. If the document is short, the significance of that same word may indicate something more important. The size of the document for purposes of this invention may not necessarily be related to the number of words in the document.

While some prior-art document search algorithms have relied on a metric related to the number of words in a document (e.g. U.S. Pat. No. 6,510,406), it has been found that this word count is not a reliable number and does not produce good results in document processing. Some of the reasons that this number is unreliable is that documents may have tables, computer source code, numbers relating to economics, mathematical formulas, and many other sections that do not give a base for normalizing important parameters.

Some prior-art algorithms have tried selecting one of most common words in English (e.g. "the") to establish a normalizing factor. The use of a single word was found to be less reliable than establishing a normalizing base founded on a collection of words. It is known that native English writers and writers that do not have English as their native language will have different word statistics in documents. (Yu)

In the research done associated with this invention, it is obvious that there is a great deal of variability in word statistics of writers in different technical disciplines. Others have also observed that the length of documents associated with patents has increased during the last three decades. (http://www.patentlyo.com/patent/2007/12/does-size-matte.html)

The preferred embodiment of this invention establishes a list of ten words that collectively provide a stable platform that reduces the effect of the variations associated with a writer's style, minimizes the variations of extraneous elements in a document such as tables, technical material (e.g. source code, numbers, mathematic equations), and allows for rapid document processing. While the list below is just one exemplary embodiment, other words, other quantities of words, or even numbers are possible in alternate embodiments. The key aspect of the novel teaching of an embodiment of the invention is that a normalization of the effective size of a document is possible and is achieved in part by using selected words to overcome the effects of writer's style and the extraneous contents of a document.

TABLE 1

| Common Word | Ratio* |
| --- | --- |
| the | 1.0000000 |
| of | 0.4562922 |
| to | 0.2664312 |
| and | 0.2661470 |
| is | 0.2201333 |
| in | 0.2147822 |
| for | 0.0952518 |
| be | 0.0923797 |
| as | 0.0895619 |
| by | 0.0787345 |

*Ratio (with respect to "the")

The "Ratio" column of the above table provides a weighting factor so that when combined, all words contribute equally to the normalization process. For example, in the millions of documents examined, the word "of" occurs less often (46%) as the word "the". To contribute equally to the normalization process, the number of times the word "of" occurs in the document must be adjusted to provide an equal contribution.

In a simple example of using the above table to establish a normalization number, assume the following words were in a document:

TABLE 2

| Word | Ratio* | Count | Value |
|---|---|---|---|
| the | 1.0000000 | 100 | 100.0 |
| of | 0.4562922 | 50 | 109.6 |
| to | 0.2664312 | 20 | 75.1 |
| and | 0.2661470 | 25 | 93.9 |
| is | 0.2201333 | 22 | 99.9 |
| in | 0.2147822 | 20 | 93.1 |
| for | 0.0952518 | 10 | 105.0 |
| be | 0.0923797 | 9 | 97.4 |
| as | 0.0895619 | 8 | 89.3 |
| by | 0.0787345 | 8 | 101.6 |

The word "of" occurred 50 times in the document. Dividing 50 by 0.4562922 gives its contribution to normalization as 109.6. While other ways are possible to calculate and combine these words/occurrence ratios, in the preferred embodiment simple averaging is used. Summing up all the values (964.9) and dividing by the number of words that have a count value (10), the average is 96.49.

The count of all other words in this document is now divided by 96.49 to obtain the WordRatio for that word (it applies only to the word in this document). For example, if the word "photon" were present in this document 7 times, its WordRatio would be 0.0725 (7/96.49).

If a word does not occur in a document, it is not added in to the total and the total is averaged by dividing by one less value. For example, using the ten words in the above table, if the word "by" was not in the document, the total of all the words would be 863.3 and this would be divided by 9 to get the average weighted value of 95.92. In that same example, the word "photon" would now have the WordRatio of 0.0730 (7/95.92).

Functions other than the average can be used for normalization. Alternative statistical numbers such as median value, adjustment based on standard deviation, or correlations related to specific document content can be used to achieve a number representing a normalization factor.

The selection of these ten words was not done based on them being the most common words; they are not the most common words. These words were chosen because these specific words and the weight factor in toto provide a good mix of words that capture the variations of the styles of different writers and permit extraneous material to not be counted in the total size. For example, the words "the" and "be" show up infrequently in listings of computer code. The words "of" and "be" show up less frequently in flow charts and chemical tables than in ordinary text. The words "as" and "is" show up less frequently in business tables and statistical information.

The WordRatio becomes the normalization factor applied to many different aspects of document matching and classification. For example, in technical documents, select words unique to that technology are identified. Statistics are kept for the number of times that each word occurs in all documents based on a histogram of the lowest occurrence (10%) in a document, median occurrence (50%) and the highest number of occurrences (90%) in a document. These numbers though are not based on the actual number of times the word occurs but the ratio of the number of times the word occurs divided by its WordRatio in each document. This becomes necessary because, as was pointed out previously, in US patent documents, the number of words in the average patent has increased substantially through the years and there would be no reliable way to compare these documents based on the actual number of occurrences for specific key, technical words.

It was observed that US patent documents now discuss prior-art invention in much more detail so that it can be distinguished from the description of an embodiment of the invention in the patent application. As such, many other words are being mentioned in passing without the document actually discussing that particular technology. The use of the WordRatio combined with the statistical information on word occurrence overcomes that particular problem.

Some of the novel teachings of WordRatio as used in this invention are that:

There is a collection of words that lessens the effect of an authors style (and style differences between native and non-native English writers)

The count of the number of times a word occurs may not be a reliable indicator of its importance in the document. The ratio of the number of time a word occurs with respect to specified group of words is a more reliable indicator.

There may be extraneous material in a document that enlarges the size of a document and degrades the reliability of prior-art statistics. The use of the WordRatio statistic associated with a word produces more reliable statistics.

As will be discussed later, the use of WordRatio in identifying words that are significant (based on defined categories) is more reliable than the number of times the word appears in that category.

As will be discussed later, the use of WordRatio in document searching to identify when a word is significant to that document produces a more reliable result. In the preferred embodiment, the use of the WordRatio for the word based on the 10%, 50%, and 90% occurrence of that word in all documents using that word, is a more reliable indicator than using just the number of times the word occurs.

Also, to be discussed later will be the use of WordRatio in document classification to identify when a word is significant to that class produces a more reliable result. In the preferred embodiment, the use of the WordRatio for the word based on the 10%, 50%, and 90% occurrence of that word in all class documents using that word, is a more reliable indicator than using just the number of times the word occurs.

Word Importance

Base Importance Value Across Documents

The importance of a word is dependent upon the desired results of the analysis. If the syntax of a sentence is the desired result of the analysis, then words like "the" as in "the dog" has significance since it identifies a particular dog. In many document analysis programs that employ selected words to understand the content of the document, the word "the" is not particularly significant since it occurs so often and is in virtually all documents.

In certain technical documents relating to optics and physics, the presence of the word "photon" might, at times, have greater relevance to understanding the contents of a document than more common words (e.g. "the"). The placement of a word in particular sections of a document may also indicate its greater or lesser importance. For example, the presence of "power-up" in normal writing may be something of normal importance "power-up" in the Table of Contents conveys that a section of text is dedicated to this topic and the word placed there, has greater contribution to the understanding of the document.

In some prior-art document search/classification technology approaches (e.g. U.S. Pat. No. 6,745,161), selected words were used with the same level of importance (Boolean search) or relatively few levels of importance (e.g. values of 1-4). Prior-art systems may also have stagnant, pre-assigned importance values for these words. This value may have been established at some time during the creation of the program. The words often had a value chosen based on a mix of documents from many different fields without regard to its importance in any particular field.

The importance of a word in the present invention is distinguished from prior-art inventions because the importance of a word is not a static value. The importance of a word in a particular discipline(s) is known, its importance to the document is known, and its importance in a section of a document is known. The self-learning system automatically adjusts to the changing importance of words as new documents are written. There is no requirement that a word be in known in any dictionary (e.g. known in standard dictionaries or within one of the dictionaries of the present invention).

The algorithms used in the selection of words across all documents and the assignment of an initial value avoids problems of employing the skills of an expert in each field, assigning a consistent, relative value across hundreds of thousands of words, and avoids the problem of maintaining the integrity of the system when new documents and document types are introduced for analysis. The technique is valid across many different human languages since the selection of the words is based on the word's distinctiveness in the defined categories.

The discussion that follows in this section primarily relates to establishing a base value for a word in relationship to all other words across all the documents. A following section explains how this base value is then adjusted based on the significance of the word to a specific document.

One way to identify other documents that are similar to a reference document is to implement a search function that uses words from the reference document. Selection of these words is based on their ability to provide useful insight on the topic of that document. In many prior art search algorithms, there were relatively few words (Search Words) that could be chosen, all the words were treated with the same importance (importance value), and the list of words was relatively stagnant in that they were only infrequently updated.

"A theory of term importance in automatic text analysis" (Gerard Salton et al., 1974)i, provides a good base of concepts that aid in understanding the underlying assumptions used by many current document search/classification programs. While this document is not the most recent example of the concepts of document search/classification technology, it does provide a good single-source document allowing for a discussion on many significant issues related to such technology. It also describes how many current systems implement such technology. Discussions presented after this will show how the technology disclosed by Salton have evolved to the technology currently known in the art.

Salton identifies a method of assigning an importance value to terms on page 5 of the paper In particular, a term weighting system which assigns to each term k a value $w_{kj}$ consisting of the product of its frequency of occurrence in document j ($f_{kj}$) multiplied by its discrimination value $DV_k$ $$w_{kj} = f_{kj} * DV_k$$

produces recall and precision improvement of about ten percent over methods where only the term frequencies $f_{kj}$ are taken into account.

Figure 4:
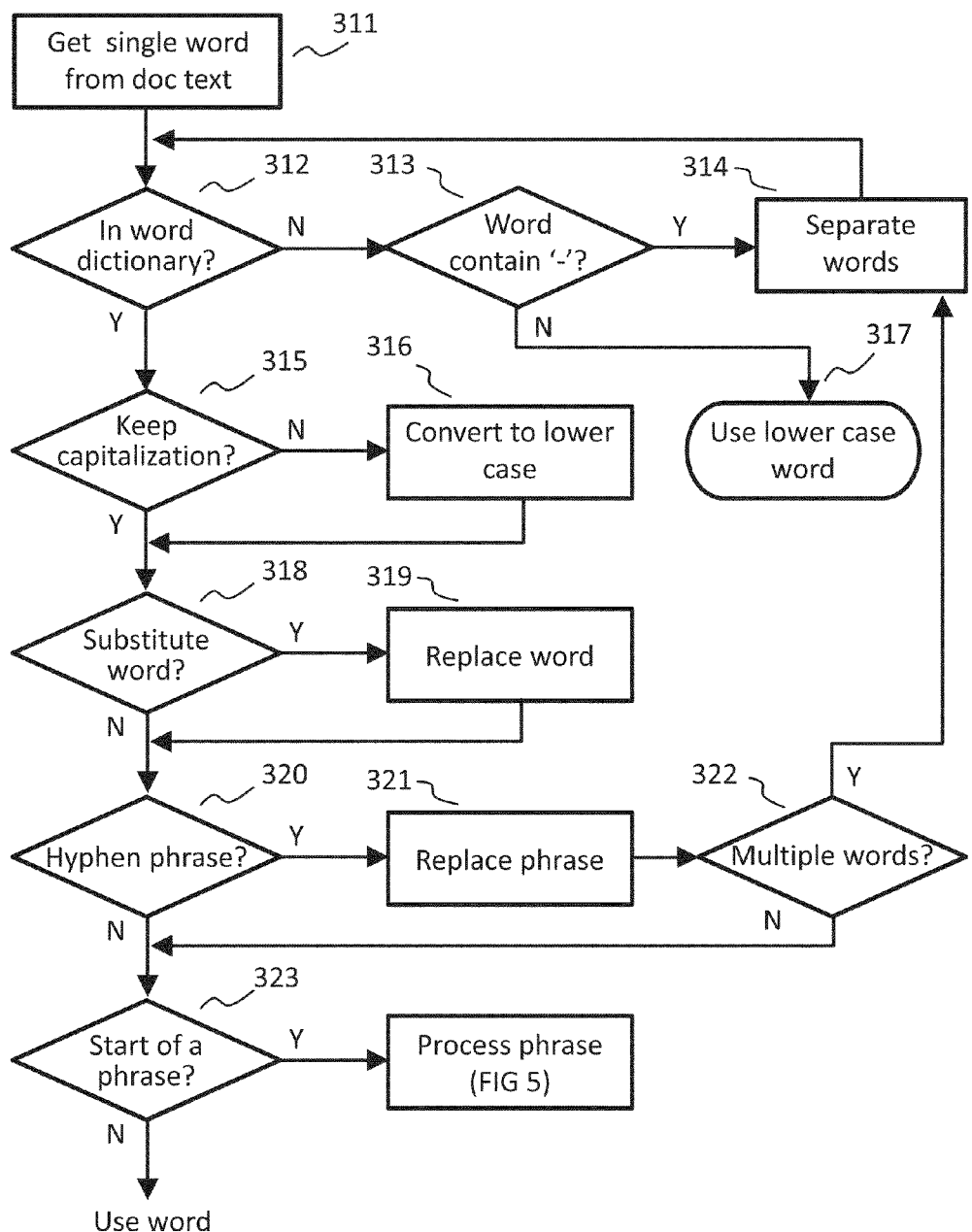
FIG. 4 shows an example of the processing of a word during document analysis.

Salton suggests that only words that appear in 1%-10% of the document be used for analysis. On page 7:

It may be seen that a U shaped curve is obtained in each case, with the following interpretation:
a. the term with the very low document frequencies, located on the left-side of FIG. 4 are poor discriminators, which average discrimination value ranks in excess of t/2 for t terms;
b. the terms with the high document frequencies exceeding n/10, located on the right-hand side of FIG. 4 are the words discriminators, with the average discrimination value ranks near t;
c. the best discriminators are those whose document frequency is neither too high nor too low—with the document frequencies between n/100 and n/10 for n documents; their average discrimination value ranks are generally below t/5.

Figure 5:
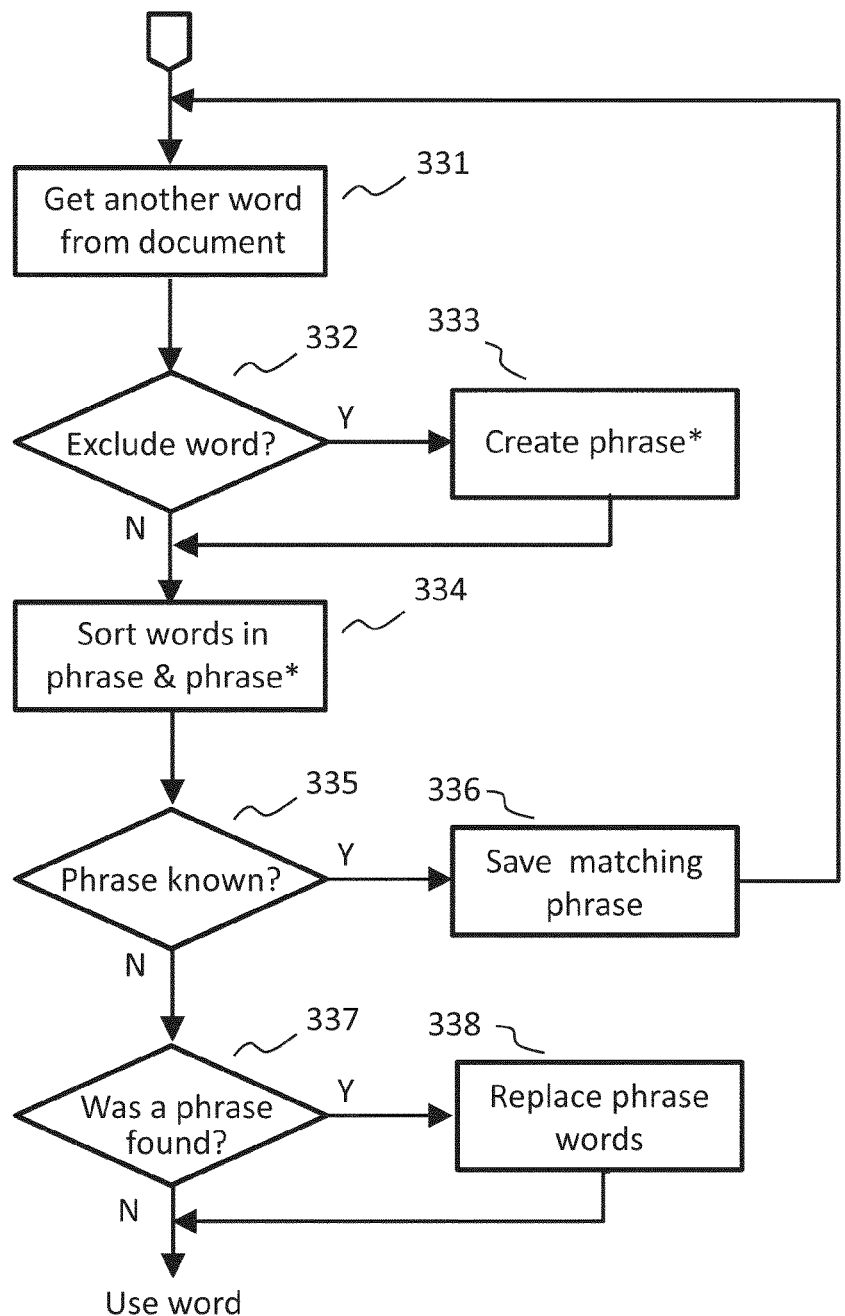
FIG. 5 shows an example of the processing of a phrase during document analysis.
Figure 6:
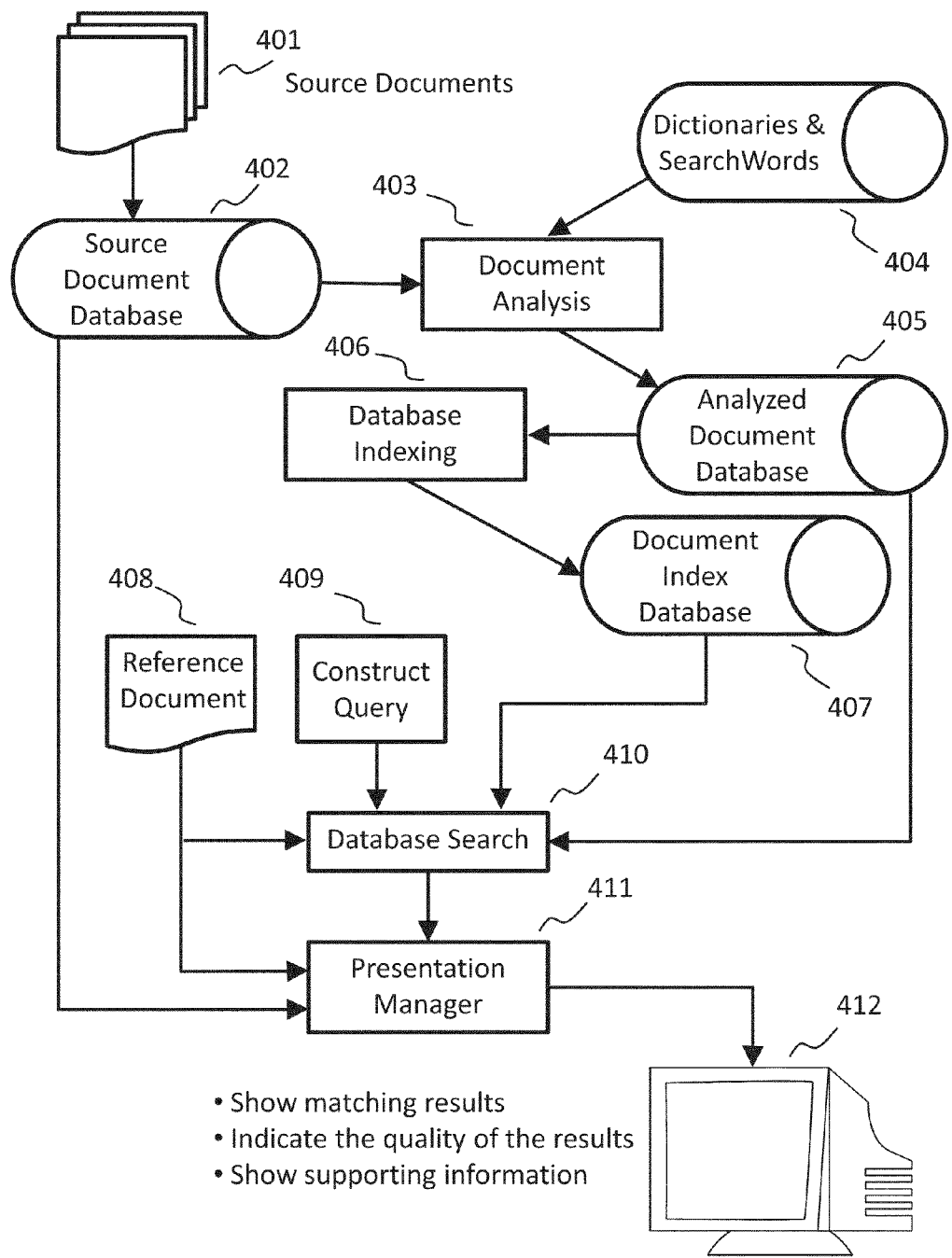
FIG. 6 shows an example of the flow of information in document search.

Salton continues with the discussion of the discriminators where on page 9 he writes:

The conclusion to be reached from the data of FIGS. 5 and 6 and of Table 1 is that very few good discriminators are included among the bottom seventy percent, or among the top four percent when the terms included in a collection of documents are taken in increasing document frequency order. This fact is used to construct an indexing strategy in the reminder of this study.

Salton's analysis, like many current search/classification methods, attempts to suggest guidelines during the search phase. Typically, after the key words of a reference document have been identified, a query is constructed that is then used to search the database of documents to identify related documents. On page 10 he writes:

c. Terms whose document frequency is too low—below n/100—are so rare and specific that they cannot retrieve an acceptable proportion of the documents relevant to a given query; hence their use depresses the recall performance. Those terms should be transferred into higher frequency terms—left-to-right on the graph of FIG. 7—therefore enhancing the recall performance.

On page 11:

The other left-to-right transformation which is required for recall enhancing purposes is now equally obvious. Low frequency terms with somewhat similar properties, or meanings, can be combined into term classes, normally specified by a thesaurus of related terms, or synonym dictionary. When a single term is replaced for indexing by a thesaurus class consisting of several terms, the assignment frequency of the thesaurus class will in general exceed that of any of the components included in the class. Thus:

The main virtue of a thesaurus is its ability to croup a number of low frequency terms into thesaurus classes thereby enhancing the recall performance.

In the preferred embodiment of the present invention, a standard thesaurus of somewhat similar properties or meanings is not used during the creation of the query (document analysis phase) or during the query search phase (document search phase). It was found that the group of these somewhat related words would actually cause ambiguity and lessen the qualities of the matches. This was due to the fact that not all thesaurus entries meant the same as the initial word. It meant the same as the initial word under some circumstances but meant something different under different circumstances (e.g. different topic areas, different document types).

The use of the thesaurus is very common today and thus teaches away from the present invention. In an alternate embodiment of this invention, another dictionary could be present containing words that were similar under most conditions of usage for documents of different topic areas and different types that would be used during the document analysis and/or document search phases of the methods of an embodiment of the invention.

True synonyms that mean virtually the same as the original word such as "buy" and "purchase", "petty crime" and "misdemeanor", and "quickly" and "speedily" are very useful and should be considered as an alternate embodiment Synonym Dictionary. Other typical synonyms such as "student" and "pupil" can lead to an inaccuracy in matching since pupil can mean student but also relate to the pupil in the eye.

An alternate embodiment of the invention would be a synonym dictionary and the supporting analysis that would try to match which sense (meaning) of the word was being used when a word could be used in two different ways (e.g. the word pupil). One such prior-art method to provide this disambiguation (making it less ambiguous) can be found in U.S. Pat. No. 7,734,623.

Salton addresses the issue of phrases in documents on page 12. It is suggested:
  b. common function words are removed and a suffix deletion method is used to reduce the remaining query words to word stems;
  c. the remaining word stems are taken in pairs, and each pair defines a phrase provided that the distance in the text between the two phrase components does not exceed two (at most one intervening word occurs between components), and provided that at least one of the components of each phrase is a high frequency term;
  d. phrases for which both components are identical are eliminated;

The above process is again widely used in the industry today in the processing of phrases. The present invention does a reduction to a common word (similar in some ways as the stem word of Salton's step b). The present invention does not strip away words that are not high-frequency. All words are used (see a limited restriction under acronyms under special circumstances). Duplicate words in a phrase are not removed as recommended by Salton in Step (d) above. Phrases like "point-to-point" referring to a network connection are an allowed phrase and useful in spite of the fact that the word "point" is duplicated.

Again discussing phrases, Salton like many today, teach away from the novel teachings of the invention on page 11:
  Indexing phrases should be constructed from high frequency single term components in order to enhance the precision performance of the retrieval system.

While in an alternate embodiment many of the low/medium/high frequency terms could be the only included words in the phrase, it was found that several low frequency words (e.g technical terms) and/or several too high (according to Salton) terms could be combined together to create very meaningful search terms (e.g. acronyms). For example, the too high words "power" and "up" can be combined to "power up" referring to something like a computer and thus a very phrase "powering up a computer" would not be a significant search phrase for Salton but allowable by the present invention.

In a more recent paper, the importance of low frequency occurrence of words was researched. The paper "The clustering power of low frequency words in academic webs" by Price et al., published in the Journal of the American Society for Information Science and Technology (2005, vol 56 pp 883-888)
  Infrequent words have often been omitted in information retrieval systems with the understanding that they are likely to be spelling mistakes or obscure words with low average document discriminatory power (Salton, Wong & Yang, 1975; van Rijsbergen, 1979; c.f., Weeber, Vos, & Baayen, 2000). This would be highly desirable for SWI applications because eliminating low frequency words reduces the dimensionality of the data for clustering. This can significantly speed up clustering because low frequency words are predominant in document collections, in terms of distinct word occurrences (Zipf, 1949). A significant proportion of low frequency words in academic webs are not errors, however (Thelwall, 2004c). Hence, it is an open question as to whether they will be useful to help cluster academic web sites. Note that there are other approaches to reducing the dimensionality of the data. Latent Semantic Indexing (LSI) (Deerwester, Dumais, Furnas, et al., 1990) is one logical choice. This operates by identifying underlying patterns in word use, allowing documents to be indexed against the patterns rather than individual words. The complexity and time taken to run an LSI analysis has lead to a similar, but simpler, approach (Kohonen, Koski, Lagus et al., 2000), which selects words at random from documents for indexing.

In the paper, Price discusses a Vector Space Model that matches similar words in documents with a weighting factor based on occurrence and applying this to information available on academic web sites. Normalization of the occurrence of the words based on the length of the document (such as implemented in the present invention), adjusting the weighting based on the low/median/high normalized occurrence, using integrated dictionaries to remove ambiguities of words, and the acronym processing.

The research indicated that they were not successful in their approach of document processing when comparing their computer results obtained with the human processed results. This interesting conclusion recognizes the importance of low frequency words but admitted it was not yet clear how to create a successful algorithm.
  We have shown that low frequency words are useful for academic domain clustering. This suggests that a significant proportion of low frequency words contain subject-related information. As a result, it will be undesirable for future SWI research to have a policy of removing all words below any given frequency threshold. Given the computational burden imposed by retaining low frequency words and the fact that automatic clustering gives poor results (FIGS. 3-4), a logical future research direction is the development of artificial intelligence or natural language processing techniques to identify and remove as many words as possible that are of undesired types (e.g. Comeau & Wilbur, 2004).

A paper "Term-Weighting Approaches in Automatic Text Retrieval" by Gerard Salton, et al. published in Information Processing & Management Vol 24, No 5 pp. 513-423, 1988 provides a comparison of text searching results using combination of document vectors. Part of the document vector is a weighting factor based on a term-frequency component, collection frequency component, and a length normalization component.

Salton recognized that document length was an aspect that could affect the quality of the search results but his length did not use the present invention's WordRatio which compensates for variations in writers styles and extraneous material in a document. Salton also made no attempt to compensate for spelling errors that he indicated he ignored vs. the present invention that brings spelling correction into the algorithm.

Salton mentions term frequency in a collection but he uses just the count of the documents for any particular collection. In the present invention, the number of documents in a collection is not relevant. The normalized number of occurrences (using WordRatio) is used compensating for document length in the various collections, removing the effect of extraneous material, spelling corrections. Additionally, his searches did not have the advantages of all the other benefits of the dictionaries (hyphenation, American/British words, acronyms, and Word Capitalization).

Salton also mentions the term-frequency component of his document vector. At times, the number of times a term is used can be indicator of its importance and therefore provides a valuable contribution to document search. The present invention provides two valuable modifications to that concept. The first modification to the term-frequency component is that the count is adjusted based on the differences in writer's styles and the effects of extraneous material (e.g. bibliographies) are removed, the term-frequency component becomes more effective.

The second improvement is based on the underlying assumption is that every word increases its value by the same amount for each occurrence. The present invention takes each word and knows the low, median, and high number of times that the word normally occurs in a document (adjusted by WordRatio). The contribution to the search result is based on this adjusted value.

For example, in a document with the words "photon" and "galaxy", both words may occur 4 times and perhaps have the value 0.6 and 0.65 respectively. If there were another document of similar length and each of these words occurred 8 times, it is possible to have the word importance change to 0.85 and 0.70 respectively. The importance value does not increase at the same rate for each word because the statistics for what is the low/median/high number of times a word occurs in documents is unique to each word.

The importance of a word can often be related to the field (topic) of the document. In general text, the word "fiber" may have ordinary importance but in topics discussing fabric (e.g. threads), optics (optical fiber), botany (e.g. fibrous plants), or medical (e.g. fibrous tumors), the word fiber may take on different values of importance. In one embodiment of the invention, the importance of the word "fiber" and the statistics associated with the word may be computed over all of the fields covered by the documents.

In the preferred embodiment, a separate set of statistics is kept (or an adjustment factor kept) for different fields of use. It may be known which field of use the document containing the word "fiber" belongs or it may be identified through processing steps. In a manner analogous to identifying the proper Acronym when several bare acronyms exist, the proper field of the document may be identified. For example, there are words that normally occur in the usage of "fiber" relating to fabric (e.g. fabric, threads, looms) and a different set of words relating to "fiber" relating to the medical fields (e.g. tumor, patient, chemo-therapy). Matching similar fields of use for a word in the reference document and the documents/classification provides superior results.

In one embodiment, the importance value of a word and the statistics about the word is uniform and independent of the section in which it occurs. In a preferred embodiment, the importance of the word and the statistics associated with the word is kept (or an adjustment factor kept) for each section of the document. In the above example, the word "fiber" used in the abstract or the table of contents is likely of greater importance in the document than if the word just occurs in the main text of the document.

In many documents, there are some common characteristics of document sections. For example, an "Abstract" section provides a summary of key aspects of the document and the identified concept here should be relevant to the main body of the document. The statistics for the importance value of a word here is significantly different than when it is in the main body section. The importance value of a word in the Abstract section may be calculated in the same way in the preferred embodiment as when the importance of the word is in the main body section but its calculated value is different since the text sections are different.

In other common document sections, a different way of calculating the importance value is more useful. For "Table of Contents" or "Word Index" type sections where there are not sentences, the presence of individual words is indicative that the words have some importance. In a simple, preferred embodiment, all words have the same importance value but alternate embodiments having known knowledge areas and key words matched to a knowledge area are possible.

The Salton algorithms and other such derived from the Salton algorithms are well distinguished from those taught in the present invention in at least the following ways:
1. The frequency of a word was measured by simply counting the number of words. The present invention:
   a. normalizes the size of the document to eliminate non-useful sections (programming code, tables, bibliographies) by the use of a table of ten base words
   b. a single word represents many different word tenses, misspellings of the word, differences between American and British English, and "made-up" words.
   c. is more statistically accurate through the use of the normalized median, low occurrence, and high occurrence of the word.
   d. allows the statistics of the word to be different in different document types instead of assuming that medical, news, technical documents all have the same word statistics as is usually done.
   e. allows the statistics of the word to be different in different document sections (e.g. abstract, claims, table of contents, glossary) instead of assuming that all sections have the same word statistics.
2. A qualified acronym is treated as a word instead of being independently processed (or more usually not even processed).
3. The discrimination factor for a word is much weaker in prior-art document search/classification.
   a. In Salton, it was recommended that only words that are in 1% to 10% of the documents be included in the list of discriminating words and teaches away from that used in the present invention. For example, using the methods of the preferred embodiment as applied to the US patent database, a word need only be in 0.0011% of the documents. Price tried to lower that document percentage of Salton and failed but recognized the usefulness of specific words occurring minimally in topic areas.
   b. The discrimination factor is not based on the total number of documents that contain the word. It is based on the number of different topic areas that include the word. For example, if there were only 7 topic areas and the word occurred in 100% of the documents in just one of the topic area, then it could possibly be in 15% of the documents (above the 10% maximum of Salton) but included in the present invention because having a high discrimination factor (i.e. identifying documents in one topic area). The use of any percentage number of a word in a document across the database of all topic areas is thus a fundamentally flawed approach.

c. The use of qualified acronyms that join together non-important words in a phrase was found to be beneficial. Salton[i] taught that phrases consisting of only the keywords should be processed and non-keywords that occur between keywords should be eliminated.

d. The use of the WordRatio to normalize the difference in difference in document topic areas produces better discrimination values since there are major style differences used by writers discussing different topics.

e. The selection of important words is not made because of the presence of a word in a dictionary (e.g. a list of words known to be important). Because of this, it is not necessary for those skilled in a specific art to assist in word identification thus mitigating quality and cost concerns. As words enter the lexicon of a specific topic area, the words are automatically eligible to be rated important. Yet another benefit is that words that become too common have their discrimination value automatically lowered.

f. The use of the same discrimination factor across multiple document types as taught by many prior-art algorithms is not as effective as the use of different discrimination factors across document types. Salton computed a discrimination factor for a word based on the words in the Cranfied, Medlars, and Time document databases that correspond to aerodynamics, medicine, and word affairs document types respectively. An improved algorithm of this invention is that different discrimination factors would be used for each of these document types. The same discrimination value would exist for topic areas within the medicine document type (e.g. cancer research, pharmaceuticals, diagnostic equipment).

g. The usage of the Word Capitalization dictionary allows words that have the same letters to be distinguished and have different discrimination numbers. Chemical elements, acronyms ("boss" vs. "BOSs" or "BOSS"), and names can be uniquely identified and have the proper discrimination value used even when words are spelled the same.

4. The arrangement and usage of the SearchWords dictionary in one method of the invention allows for continually updating and maintaining the list of important words and their importance values without the need to reprocess previous documents in the database.

Figure 3:
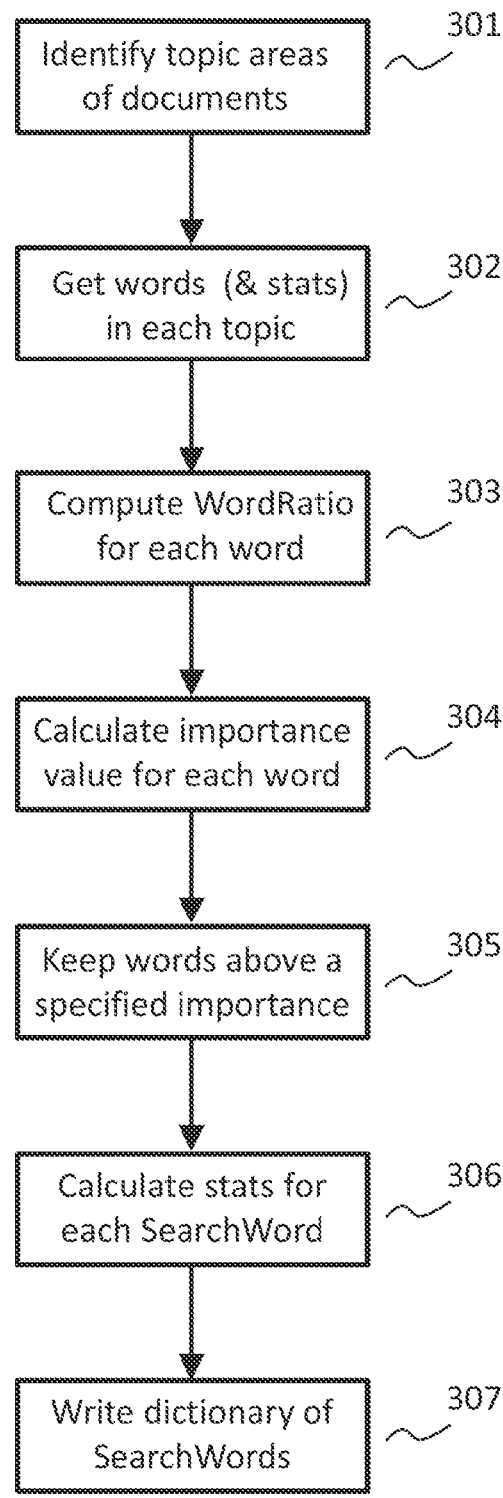
FIG. 3 shows an example of processing steps to create the SearchWords dictionary.

FIG. 3 is a processing flow diagram showing the major processing activity of the preferred embodiment that creates the SearchWords dictionary. The SearchWords dictionary contains an entry for each important word used in document searching/classification. An entry consists of the word (or the word representing an entry in the Derived Word dictionary, or the qualified acronym term), a numerical value used for importance, the low/median/high occurrence value (normalized by WordRatio), and adjustment values associated with document sections and/or document topic areas.

The primary aspect of this flow diagram is that it creates an importance value for each word based on the occurrence of the word in various document topic areas and the occurrence of the word in each topic area. As will be discussed later, this importance value is then dynamically adjusted during the analysis of a document based on the occurrence of the word in a section, topic area of the document, and length of the document. In general, the flow diagram shows the following: identify the documents that are in each topic area (e.g. patent classification), count the number of documents in each topic area, the number of times a word is used, & the number of documents containing the word, compute the WordRatio for each word in each topic area (e.g. the same word would have different WordRatios across topic areas), calculate the importance value for each word based on the number of topic areas and the number of normalized occurrences (keep section statistics), words above a specified importance value become SearchWords, using documents for all topic areas, calculate the low/median/high number or normalized occurrences for each Searchword (keep section statistics), and each entry in the SearchWords dictionary contains the importance value for each word, statistics for adjusting its value based on section, normalized occurrences, and topic area. The flow diagram will be discussed in more detail below.

Referring back to FIG. 3, block 301 analyzes a set of documents by identifying the topic area of the document (e.g. its patent class number). All the words in these documents are processed (block 302) utilizing the preferred embodiment of the dictionary processing described above. A separate list of words and the associated statistics are maintained for each topic area. The WordRatio, using the preferred embodiment method described above, is computed (block 303) for each word in each topic area (e.g. the 437 primary US patent classes) and each document section (e.g. abstract, invention description).

In block 304, the importance value for each word is calculated. There are many methods that can be used to establish an importance value (e.g. Cosine method for discrimination) and all such methods known by one skilled in the art are to be considered as alternate embodiments. The preferred embodiment utilizes the following method to find the importance value for words in the main body of the document:

Calculate the Quality Factor associated with the document count for each word ($N_Q$)

1. For each topic area (C), find the fraction of documents ($F_C$) that have this word.

$$F_C = X_C \div N_C$$

Where: $X_C$=Number of documents that contain word W in topic area C
$N_C$=Number of documents in topic area C
$F_C$=0 when $N_C$ or $X_C$ is zero.

2. Find $F_{MAX}$, the maximum value of $F_C$ across all topic areas.
3. Calculate the value H which is $=0.3173 \times F_{MAX}$.
4. $V_1$=the number of topic areas that contain $F_C$>0.
5. $V_2$=the number of topic areas that contain $F_C$>H.
6. The Quality Factor associated with the document count for word W ($N_Q$) is:

$$N_Q = ((1-V_2) \div V_1) + ((V_1-1) \div V_1)$$

Where: $N_Q$=1 if $V_1$=1 or $N_Q$>1
$V_3$=the number topic areas that have $F_C$>0.02
$N_Q = N_Q \times (1-(V_3 \div \text{Number of topic areas}))$ Calculate the Quality Factor associated with the WordRatio for each word ($R_Q$)

1. Use the WordRatio calculated for each word in each topic area (block 303)
2. Find $R_{MAX}$, the maximum value of WordRatio across all topic areas.
3. Calculate the value H which is $=0.3173 \times R_{MAX}$.
4. $V_1$=the number of topic areas that contain WordRatio>0.
5. $V_2$=the number of topic areas that contain WordRatio>H.

6. The Quality Factor associated with the WordRatio for word W ($R_Q$) is:

$$R_Q = ((1-V_2) \div V_1) \div ((V_1-1) \div V_1)$$

Where: $R_Q=1$ if $V_1=1$ or $R_Q>1$

Calculate the Base Word Importance value for this word ($I_W$)

$$I_W = N_Q \times R_Q$$

The same algorithm can be used to calculate the importance value for each section of a document. The importance value can also be different for different types of documents. The importance value for a word can be different for a database of documents associated with patents, legal issues, resumes, news articles, or financial investing. Each of the importance values can be part of a single entry associated within the SearchWords dictionary.

Ways to identify different document styles (categorization) include using the Naive Bayes (NB) classification methods which are simple, scalable to large feature sets and among the most effective algorithms to classify text documents. NB being the preferred embodiment of the invention but alternative, more complex document classifiers such as Random forest or Gradient tree boosting algorithms can also used. A prior-art reference describing document categorization is a publication "Machine Learning in Automated Text Categorization" by Fabrizio Sebastiani et al. in 2002.

Continuing with the discussion of the processing blocks in FIG. 3, block 305 selects only those words that have specific characteristics (e.g. importance value, document occurrence values, a special list of words identified as being important, less than some maximum number of letters). For the preferred embodiment, using the database of US patents, and in the Description section of the patent, the words selected to be in the SearchWords dictionary occur in a minimum of 40 different documents (out of 3.7 million documents or 0.0011% of the time) and have an IW≥0.5.

In block 306, using all the documents for a particular database (e.g. US patents), the statistics of how many times the word occurs across all documents is computed. Create a histogram of WordRatios for each word from all documents that contain that word. Find the median value of the WordRatio, RM, (i.e. where 50% of the documents that contain that word are greater than this value and 50% are less). Find the value of the WordRatio, RL, where 10% of the documents contain a value less than this number (in documents that contain that word). Find the value of the WordRatio, RH, where 90% of the documents contain a value less than this number (in documents that contain that word).

In alternate embodiments, the statistics other than these values may be collected and stored in the SearchWords dictionary. While the above statistics apply to words in the main body of the document, other sections of a document can contain different histogram statistics or different parameters that would relate to altering the importance of a word for that document section for a particular document type. It is possible that some embodiments may wish to contain only one document type or consider statistics that relate to the entire document and not just one section of the document and these should also be considered as alternate embodiments of the invention.

In block 307, entries for each of the selected words is created and stored in the SearchWords dictionary. Depending on the database analyzed, the number of entries can be large. For example, in the US patent database, 157,000 words and acronyms were selected to be included. You may recall that the concept of a word is actually the entry that represents a group of words (a Derived Word entry). Many of the most common words are omitted because they are in so many topic areas that the importance value is too low. What remains are words that are very relevant to different specific topic areas in particular document types (e.g. resumes, patents, legal).

In many prior-art approaches, the list of important words used in processing a dictionary is very much smaller than in the present invention. For example in U.S. Pat. No. 6,189,002 entitled "Process and system for retrieval of documents using context-relevant semantic profiles", Roitblat defined the number of unique words in the dictionary of 10,000 words vs. the 157,000 words used just for patents. It is these less often used words that provide the greatest differentiation between documents where topic areas have similar sets of words but used in entirely different topic areas (e.g. pitch as in baseball, music pitch, or golf pitch)

One benefit of storing the importance value of each word in a separate dictionary instead of storing the importance value in each document is that it can be more easily updated. Analysis of the important words will be dynamic especially as new technical words or legal topics evolve. A word that appears in one or two documents to begin with can become hundreds at a later time. Its importance value may therefore increase. Using a dictionary distinct from the document allows for updating importance values without reprocessing all the documents in the database. Indeed, one of the benefits of the present invention that may be appreciated by those skilled in the art, is that once a document is processed, there is much less need for that document be processed again.

The statistics and importance values collected across multiple documents are known as its "base importance value". As described above, there may be several "base importance values" depending on the type of document or values based on different sections of the document. There may also be a "base importance value" and identifiers for document sections and adjustment values from that value. There may also be "base importance values" associated with different fields (topics) being discussed by a document. There may also be a "base importance value" and identifiers for document fields and adjustment values from that value. All of these and other methods for obtaining and maintaining the importance value of words across multiple documents is contemplated and should be considered to within the scope of this invention.

Word Importance

Related to a Document

A word in a document can have an importance value and this importance value is established from a variety of factors in accordance with the methods of the present invention. As was disclosed in the above method, there is a base importance value that was determined across all documents based on the number of occurrences (adjusted by the WordRatio), the number of topic areas that include the word, the high/median/low statistics associated with a word, and the section of the document that contains the word.

The discussion of the importance value of a word that follows is associated with the adjustment of the base importance value as is applied to a specific document. For example, during the analysis phase, a reference document is analyzed to identify information that can then be used for searching the database. The base importance value of selected words was determined at that time. In the process of trying to locate documents similar to a reference document, the base importance value for each SearchWord selected needs to be uniquely adjusted.

The importance value of the word in each one of the documents being searched (to determine its degree of similarity) also has the value of the corresponding word separately computed.

In many prior-art inventions, the value of a word is established once and then stored as part of the entry of a word in a dictionary or its value is stored in the document. In the present invention, there is an aspect of the word importance stored in the SearchWords dictionary but the final value of the word is dynamically assigned and the value for that word is unique in each document but not stored in the document. As mentioned previously, by not storing the importance of a word within a document allows the importance value to change as other documents are added to the collection and perhaps entirely new document types combined from different sources.

In the analysis of a document, the presence of a word in one section may take on a value different than the same word in a different section. The concept of restricting the matching or using of a word base on a section of a document was done previously. For example in mnoGoSearch (http://mnogosearch.org), there is an option to select which section of the document should be searched. Their default sections are:

Section body
Section title
Section keywords
Section description

In this system, each section can be included or excluded in the search. On the preferred embodiment, each word can have a different importance value based on the different sections of the document. The algorithm that assigns the importance value from the base importance value may also be different. Using this method provides more accurate matching of a reference document to the document in the database or better identification for document classification.

It should also be noted that in mnoGO, the word matching is the typical binary search algorithm. Binary Search meaning that a word matches (e.g. a 1 value for matching) or does not match (e.g. a 0 value). The binary search is the most common solution to handling the issue of assigning an importance value. This is distinguished from the present invention where a word can take on an infinite number of importance values which, in the preferred embodiment, are all the values between 0 and 1.

To calculate the importance value for a word in the preferred embodiment, the following algorithm is used. This algorithm applies to a word in the main body of the document. Different algorithms can be used, as well as different algorithms in different sections of the document without departing materially from the novel teachings of an embodiment of the invention.

1. Compute the Word Ratio ($R_W$) for this word in this document, in this section.
2. Obtain the statistics and base importance value ($I_w$) for this word, for this section, in this type of document from the SearchWords dictionary. As previously explained, the statistics are:

$R_M$=the median value of the WordRatio for all documents that contain this word
   $R_L$=the value of the WordRatio for the lowest 10% of all documents that contain this word
   $R_H$=the value of the WordRatio for the lowest 90% of all documents that contain this word 3. Compute the word importance value depending on the value of $R_W$
   If $R_W \geq R_H$ then the word importance=$I_W$
   If $R_W < R_L$ then the word importance=$0.01 \times I_W$ If $R_M \geq R_W < R_H$ then the $$\text{word importance} = I_W \times ((M \times R_W) + (0.5 - (R_M \times M)))$$

where: $M = 0.5 \div (R_H - R_M)$

If $R_L \geq R_W < R_M$ then the $$\text{word importance} = I_W \times ((M \times R_W) + (0.1 - (R_L \times M)))$$

where: $M = 0.5 \div (R_M - R_L)$

Some of the benefits of Search Words as used in this invention are that:

There is an importance value that can be associated with a word and the importance value can take on many values (e.g. all the values between 0 and 1). Part of this importance value for this word is based on the value derived from its importance to a particular subject matter.

The selection of the word to be used in document search/classification is not related to its presence in any dictionary.

The importance of a word may decrease as the number of topic areas it has membership increases.

The importance of a word may increase as the number of times the word occurs (normalized by the Word Ratio) within topic areas.

An algorithm exists that can be used to establish a base value of a word and that algorithm works across multiple topic areas (e.g. technical areas, job areas), and works across multiple human languages.

Different base values for a word can exist across document types (news, technical, legal, resumes)

A phrase (e.g. acronyms or an important sequence of words) and the variants of that phrase can be treated as a word within the processing steps of this invention.

The importance of a word across documents and within documents is not uniform. The importance of a word in a document may be changed based on:

The number of occurrences of that word in that document (normalized based on the Word Ratio.

The number of times the word normally occurs in all the documents that contain that word. In the preferred embodiment, the importance is adjusted downwards if the normalized number of occurrences is less than the median value with a function that includes the number of times in the lowest 10% of documents. If the normalized number of occurrences is greater than the median value, the importance is increased with a function that includes the number of times in the highest 90% of documents.

In an alternate embodiment, if the document type or other information about the document is known, additional importance can be enhanced or decreased depending on whether the word is important to that type of document.

In the preferred embodiment, if the section or other information about the a location of a word within a document is known, the importance of the word can be increased or decreased depending on whether that section is important in the search/classification process.

The importance of a word should not be directly linked to the document (e.g. stored within it or in a separate table linked to that document). In the preferred embodiment, the base importance is used across all documents (and then dynamically adjusted for each document). As new documents are learned, the base importance may change but the reprocessing of previous documents is not required. As new words are introduced into documents (e.g. the invention of new technologies), the word may be little used but as greater number of inventions employ the technology, the statistics associated with a word will change. Delinking the importance value from the source document negates the need to reprocess older documents.

Processing a Word During Document Analysis

In the preferred embodiment, the process of taking freeform text and creating a list of words, bare acronyms, qualified acronyms, and phrases is shown in FIG. 4. This exemplary embodiment is just one of many ways that words and phrases can be extracted and all such means known by one skilled in the art should be considered as alternate embodiments.

Starting out, an initial attempt can be made at separating out text based on grouping. A document may be known to be a specific document type (e.g. legal, technical, news, resume) and perhaps have known sections (e.g. patents have abstracts, claims, description of invention, table of drawings). Other common groupings of words may be within paragraphs and sentences.

In block 311, a word is extracted from the text. The starting and ending letters/numbers of a word can be identified by spaces, punctuation marks, or special characters (e.g. &, ", parenthesis). In processing phases, it is useful to know when the words can no longer be part of a phrase (e.g. after the period of a sentence but not after a period used in an initial). It is also useful to know if a group of words are all uppercase indicating an importance (e.g. heading) since word capitalization is useful in distinguishing words that contain the same letters but are different words (e.g. common word vs. acronym).

Block 311 returns words that may contain some numbers (e.g. 3D for three dimensional movies). It will normally keep the upper case/lower case letters in a word unless the surrounding words are also all capitalized in which case it returns lower case letters. It also returns an indication if this would be the forced end of a phrase (e.g. end of sentence, end of paragraph). If the word contains a hyphen, both words of the hyphenated word are returned (along with the hyphen).

A check is made in block 312 to see if the lower case form of the word is in the integrated dictionary consisting of the Derived Word, Word Capitalization, Acronym, or Hyphenated Word dictionaries. In the Acronym dictionary, if a bare acronym is not the same as a common word, or otherwise within the integrated dictionary, its lower case form is added to the integrated dictionary. This catches bare acronyms that are all lower case letters and they are mapped to the properly capitalized Acronym (e.g. "crt" is translated to "CRT").

If the word is not in the integrated dictionary, the word is check for the presence of a hyphen ("-") in block 313. If the word(s) contain a hyphen (and it was obviously not in the dictionary), it is assumed that they are separate words (block 314) and therefore processed individually. If the word does not contain a hyphen, the lower case form of the word is added to the list of words in the patent (block 317).

In block 315 a check is made to see if it is useful to keep the word capitalization. This check is made against the information in the Word Capitalization dictionary. If the word as capitalized does not provide useful context, it is converted to all lower case letters in block 316. Words in this block, such as acronyms "BOSS" and "BOSs" keep their word capitalization but the common word "boss" or "Boss" (first letter capitalized because it's the start of a sentence) is converted to lower case. Also acronyms that do not match the known form of the acronym are first converted to lower case and then converted to the proper case in block 318 (e.g. eBeam→ebeam→EBEAM).

In block 318, a decision is made to replace the word with a different word (e.g. the derived word entry). The word replacement is done in block 319 if:

the word is misspelled, a British vs. American English word, or any other corrections from the Derived Word dictionary. The word representing the entry for that Derived Word entry replaces the word from the document.

the word is a hyphenated word and is replaced by a single word (e.g. real-time vs. realtime).

the word can be a qualified acronym. For example, electroencephalogram goes to the internal representation of the qualified acronym of EEG (i.e. ElectroEncephaloGram).

the word should be two separate words. For example, the single words form of a hyphenated word which should be treated as two words (e.g. air-jet becomes separate words air & jet).

the word is not properly capitalized, its properly capitalized form of the word is substituted (e.g. if all acronym forms of "crt" are "CRT" then "CRT" is used).

In block 320, a check is made if this is the first word of hyphenated phrase or a phrase that requires the words to be in a specific order. The hyphen would no longer be present (replaced in 318-319 or 313-314). There may be two or more words that represent a hyphenated phrase and it may be replaced by one or more words. For example, the two word phrase "state vector" is replaced by the single word "statevector". In block 320, the word "state" would have been identified as the start of a hyphenated phrase and the second word would have been retrieved from the document. It would perform all the steps starting from block 311 (essentially a recursive function) so that the properly corrected/substituted word would be returned to be paired with "state" which is then checked against the list of hyphenated phrases. If a third word of the phrase was required, it would also recursively start at block 311.

If the hyphenated phrase is found in the text, block 321 replaces the text of the document with the desired word or phrase. If the replacement is multiple words (block 322 does the check), the multiple words are separated out (block 314). Otherwise, processing continues in block 323.

In block 323, a check of this word is made to find out if this word is the start of a phrase. Phrases can be general sequences of words or a phrase that may indicate the presence of an acronym in a document (text such as "a CRT or Cathode Ray Tube") or it could just be the phrase without the presence of the acronym in the document. The preferred embodiment to implementing phrase processing (e.g. acronym phrases) for document analysis is shown in FIG. 5.

If the word is not the start of a phrase or a phrase starting with that word was not found, the word as it is now formed is added to the list of words in the document.

Processing a Phrase During Document Analysis

There are two types of phrases processed in this invention, phrases that require a specific word sequence and phrases (e.g. titles, headings, acronym phrases) that should not be as strict in matching requirements. In headings or acronyms the presence (or absence) or certain words would still be understood by a human to be the same. For example, the acronym FADC often has the phrase "Flash Analog Digital Converter"

but also is written by others as "Flash Analog to Digital Converter" or mistyped "Flash Analog Digital to Converter".

As was pointed out, words in a phrase can be transposed, chemical terms can have spaces between all words, some words, or no spaces (e.g. "tetra ethylene penta amine" but is also written "tetraethylene pentamine", "tetra ethylene pentamine", or "tetraethylenepentamine"). Words may be misspelled, words hyphenated (or combined), or acronyms can be part of the phrase. To handle the wide variations possible for phrases, the algorithm shown in FIG. 5 is the preferred embodiment.

When the first word has been identified as the starting word of a "non-strict" phrase (vs. a strict type found in a hyphenated phrase), processing starts in block 331. There a second word (or additional word) is obtained by recursively using the algorithm shown in FIG. 4. This will correctly process misspelled words, hyphenated phrases, and getting the correct capitalization of an acronym.

In block 332, the new word is checked to see if this can word can be an optional word in a phrase. In the preferred embodiment this list of words is "to", "and", "a", "the", "plus", "of", "in", "or", "for", "as", "by", "with", "at", "but", "is", and "on". In alternate embodiments, a different or modified set of words can be used. In another alternate embodiment, the list of recognized phrases could be supplemented with all the possible phrases that include these words.

If the word just found is one of these excluded words, processing continues in block 333 where a separate phrase (here called phrase*) is maintained that is the collection of words being assembled in the phrase minus the words that are excluded.

The words gathered so far in the phrase (and in phrase*) are sorted. The sort order can be alphabetical or otherwise sorted as long as the words are always presented in the same order regardless of their occurrence in the document. One problem being corrected in this step is that words can be transposed in a phrase and by having the words sorted, matching is now done using a fixed sequence of the words.

The spaces between words are deleted and the phrase (and phrase*) are checked against a list of known phrases. If there is a partial match of the phrase or a complete match (of either phrase or phrase*), processing continues in block 336. The matching phrase is saved and more words are added to the phrase until the phrase or partial phrase is not matched. Because it is possible to have a four word phrase match the first three words of a three word phrase, processing must continue until the longest possible match is made on a phrase.

When a phrase and its phrase* are no longer matching one of the know phrases, processing continues at block 337. Sometimes the excluded word is required to be in a phrase (e.g. BTO—Build To Order) and thus phrases with and without the excluded words must be positively identified. If the phrase was completely identified, the phrase words in the document are replaced with the word(s) specified (e.g. the qualified acronym identifier). The word is then added to the list of words in the document.

After all the words in the document are processed, there may be ambiguity to the meaning of some of the bare acronyms (e.g. AAA). As was mentioned previously, writers, especially those with special skills in an area use a particular set of acronyms so often, they don't bother to define them. If the bare acronym has been used and its corresponding acronym phrase has been identified in the processing of the document then the meaning of the acronym is not ambiguous. No further processing of that acronym is required.

However, if the acronym phrase has not been identified, then additional processing is done. As was discussed previously, entries for an acronym contain an additional word list that helps distinguish between various forms of the same bare acronym. For example, among three of the seven definitions of the bare acronym AAA are "Abdominal Aortic Aneurysm", "Adaptive Antenna Array" and "Authentication Authorization Accounting". Some of words that often occur in documents containing the "Abdominal Aortic Aneurysm" form of "AAA" are being used are: "blood", "patient", "aneurism", "body", and "vessel". The words in this document are checked against this list of words and the list of words associated with AAA as in "Adaptive Antenna Array" and "Authentication Authorization Accounting".

The importance value (or weighting factor) obtained from the Acronym dictionary for that word with each qualified acronym is used to compute a score for that qualified acronym. Should there be a score of sufficient importance, it is assumed that document is using that specific qualified acronym. It is possible that a score does not reflect enough statistical significance that any of the potential qualified acronyms is selected. Should this occur, the acronym remains unqualified.

An additional weighting factor exists in the preferred embodiment and is used when the document types are known (e.g. news, resumes, patents, legal). If an acronym is known to be linked to one or more specific types of documents, then additional weighting is applied when matching the associated word list with the acronym. For example, if the document being analyzed was known to be a medical journal and the bare acronym AAA had not been defined, an additional 25% weighting factor could be applied to the list of words associated with the phrase "Abdominal Aortic Aneurysm" since that phrase is more closely associated with medical documents.

In the preferred embodiment, the choice of the phrase in a document is based on the sum of the values of all the words linked with each possible acronym. For example, if the word "body" was in the document, it would have a WordRatio value and that value would be multiplied by the weighting factor known for that word associated with the "Abdominal Aortic Aneurysm" phrase. The selected phrase for AAA in this example is the one with the largest score when the value of each group of associated words is computed. Alternate embodiments can include different statistical comparisons.

Information obtained from the processing of a document as described above may be saved in a file. In the preferred embodiment of the invention, this information includes:

- entries for each unique word or the word that represents a word entry in the derived word dictionary
- an entry for each bare acronym, qualified acronym, or phrase
- the WordRatio for each word, bare acronym, or qualified acronym
- identifiers indicating types of sections that are in the document
- information that allows words, acronyms, and phrases to be linked to one or more sections of the document
- an identifier to indicate which type(s) of document it is (e.g. news, legal, technical, resume)

Alternate embodiments of information stored in each document might include the processing date, algorithm version, or dictionary versions. Such types of information would allow a determination at a later date that a document may need to be reprocessed with more recent algorithms, dictionaries, or classification of document types.

In other alternate embodiments, the information is not saved to a file but used without storing the information. In the preferred embodiment, some documents have their information stored in a database while other analyzed documents (e.g. reference documents) do not store the information to a file.

The Methods of the Invention

Document Search/Classification

There are at least two important applications where the power of the dictionaries and the importance of automatically identifying important words can be usefully applied. In one application, the search application, a database of many documents is created and another document compared to the database to identify related documents in that database. In a second application, the classification application, many documents are examined and each of these documents is placed into one or more groups of documents. In both document search and classification applications, documents area analyzed using the methods described previously.

In the document search application, a database of files can be created and there is no particular need to have an awareness of the topic areas of the documents in the database. One of the advantages of the preferred embodiment of the present invention is that all database documents can be treated the same (e.g. they can just be patents) and there is no need to reprocess documents later when topic areas are modified. If the user fashions a query to the database that includes just specific topic areas, then the results of the search can be filtered.

Likewise, there may be queries that can enhance search results using just specific document types (e.g. resumes) that are a request of the user and not necessarily a segregation of the database. In alternate embodiments, the database may be segregated in many different possible ways including document types or topic areas. The novel teachings of the present invention allow equally good document search/classification results without the need for database partitioning.

Document Search

There are many different ways that the information available after the document analysis phase can be utilized to create a database(s) useful in document search. Database technology and queries to databases are well known in the art and all such known techniques should be considered as alternate embodiments of the invention.

In the preferred embodiment of performing a document search, the major functions performed are:
Create a database containing documents of interest
Create indexes of information that allow rapid retrieval of information from the database
Analyze a reference document
Create a query about the type of results desired when executing a database search
Present the results of the query
Provide information as the quality of the matching results and the reasons each document was selected Not all of the above functions are required. For example, creating indexes into the database is not a required function since all the documents could be searched. By using the indexing function, it is possible to significantly reduce the processing time. It is also not required that there be an indication of how well a reference document matches a related document in the database, but may benefit a user of the invention. By providing a quality match indicator the user may realize that the results are worthwhile to examine or extraneous and can be ignored.

At times, a user may wonder why some documents were presented. At such times, it is useful to show information that was significant in forming the result. It not only allows a user to understand if the query was performing effectively, it also provides confidence in the integrity of the system.

FIG. 6 shows the flow of information in document search for the preferred embodiment. Documents of interest (401) are brought together in the Source Document Database (402). The collection of documents is analyzed (403) in accordance with the methods previously described. If the document types (e.g. resumes, patents, news articles) are known, that can be added to the information associated with each document or perhaps associated with an entire database of analyzed documents (405). Documents may be of more than one type. The output information from the document analysis is described above and stored in files.

To create the indexes of information contained in the database of documents, the database documents are evaluated (406) for specific information such as SearchWords. In the preferred embodiment, an index to each source document is made for each SearchWord such that given a specific SearchWord, all documents containing that SearchWord and its WordRatio in that document is rapidly accessible. That indexing information is stored in the Document Index Database. Other information that can be in that database include which section of the document the word occurs, documents of particular type (e.g. news, patents, medical), or other useful indexes to reduce the complexity/time of document searching.

For some types of document searches, a user has a document (the reference document) that contains certain types of information and they need to know if there are other documents that contain similar types of information. For example, a patent applicant prepares a document of their invention and wants to know if existing patents contain similar technology. A search query constructed (409) that identifies the database should analyze a reference document (408) using the document analysis previously discussed, perhaps restricting the dates of patents or the topic areas to be searched, indicating that only the best 10 matching documents are to be presented.

The Database Search (410) function uses the SearchWords obtained from the document analysis done on the reference document to obtain from the Document Index Database (407) those Analyzed Documents (405) that contain the SearchWords of the Reference Document. Appropriate weighting of the SearchWords is performed as previously explained in both the Reference Document and the Source Documents to produce a final score that reflects the degree of similarity between the Reference Document and each of the retrieved Source Documents.

The Presentation Manager (411) receives the list of the Source Documents that best matches the Reference documents along with a metric indicating the strength of the match. The Presentation Manager may then display that information on a computer display (412) or other device (e.g. PDA). It may also present the Source Document, SearchWords used for matching, importance values for each SearchWord, the matching Source Documents, information about each SourceWord or other information that the user may find relevant.

In other types of Database Searches, a user query may not require a reference document. For example a query can be a request to identify the earliest patent that used the term LASER in the description section or patents that have LASER in the claim terms when used in US Patent Classification 26 "Textiles: cloth finishing" after August 1982.

For resumes, the query might be to find a person knowledgeable in ABS where ABS means Anti-lock Breaking Systems. Many people use acronyms in their resume without properly identifying its meaning since it can be inferred by a person reading it. Doing a web search to locate people with the term ABS on their resume may return results with ABS but meaning "Automated Banking Systems", "Automatic Brightness System", "Air Bearing Surface" or other ABS acronyms.

Reliable results will be returned to search queries employing the novel methods of this invention because during the construction of the Search Query, the ambiguity of ABS is known by the system. In the preferred embodiment, the user would be presented with the available meanings of ABS and asked to select one or more of those choices. When the Database Search is performed, words explicitly linked to that qualified acronym would be used to include only those resumes dealing with ABS having the context of "Anti-lock Breaking Systems" are returned.

Figure 7:
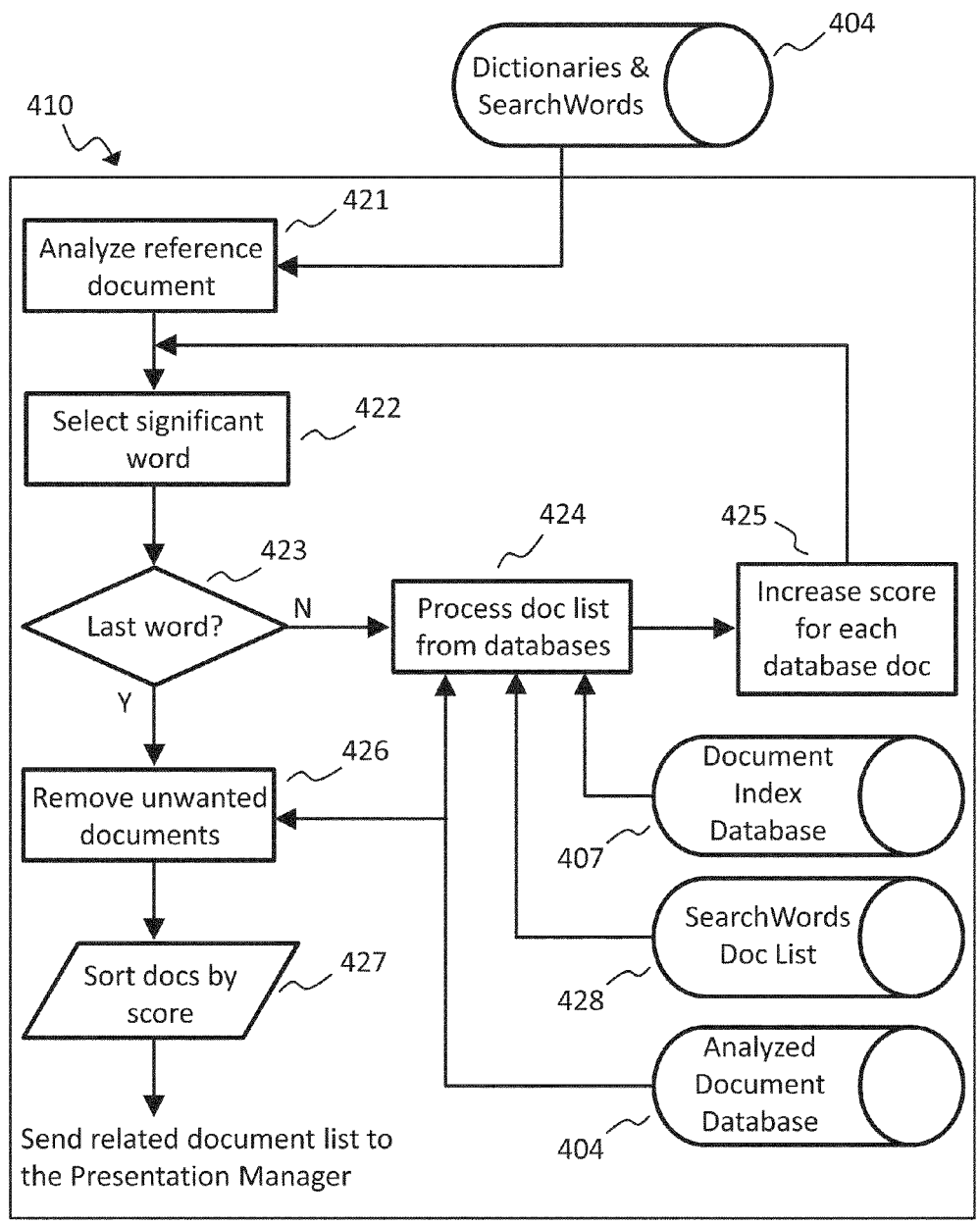
FIG. 7 is an example of the processing flow for a database search.

As was mentioned, there are many ways to implement a database search and the type of information desired by the user, size of the database, ability to retrieve information rapidly, and amount of storage are all factors that are variable as to its implementation. The preferred embodiment of a user wanting to take a reference document and search the database of just the document type consisting of patents to find the related documents is shown in FIG. 7.

Along with providing the document to be analyzed, the user can also specify other information to restrict the characteristics of documents to be returned. In this example, the user has specified a date range of 1989 through 1994 for the patents, one match words in the Description of the Invention section, has a quality match metric of 5 (on a scale of 0-10), and that only the top 50 matches should be returned.

In all the diagrams in this document, identically numbered components are the same component across all diagrams. The general Database Search processing block (410) in FIG. 6 is shown in FIG. 7 in more detail performing the functions necessary for the example being discussed. The reference document is analyzed in block 421 in the way previously discussed.

The significant words from the reference document are selected (block 422). In the preferred embodiment a word is significant if it is one of the identified SearchWords, has a minimum word importance value in the reference document of 0.1 in the specified document section (i.e. Description of the Invention) or was a word requested by the user (none specified in this example). The selected words are processed one at a time (alternate embodiments would allow parallel processing of the words) in block 424.

A word (or phrase/acronym/hyphen word) in the reference document is taken and it is used to obtain a list of documents that contain that word from the Document Index Database (407). Each Analyzed Document (405) containing the word is accessed and the word importance value in this Analyzed Document for this same document section is calculated. If the word importance value in the Analyzed document is at least 0.1, then the word is also significant in the Analyzed Document and the calculated word importance value is added to the score associated with each Analyzed Document. To keep an Analyzed Document from having a higher score than the reference document, the maximum importance value for the corresponding word in the Analyzed Document is limited to the importance value of the word in the reference document.

All the significant words in the reference document go through the above procedure so that a complete list of Analyzed Documents has been established. Each Analyzed document has a score based on summing the word importance values for the corresponding words between the reference document and the Analyzed Document. The list of documents that have the documents that scored above zero is called the related documents list.

Using this list of related documents, an additional filtering process is performed in block 426 after the last word is processed (423). Since the user only requested documents that occurred in the date range from 1989 through 1994, the documents from the list are checked with the Analyzed Document Database to determine which documents meet those criteria.

The quality match metric is computed for each document on the list by taking the natural log of the score for the document and dividing it by the natural log of the score for the reference document. Since nothing can be a better match than the original document, a perfect match is that document and all others are then referenced to that value. The match metric is then multiplied by 10 so that the match metric has a value between 0 and 10. In this example, documents that are not within the date range, below the match metric of 5, or above the top 50 matches are removed from the related document list.

The final processing block of 410 is the sorting of the top 50 documents based on their match metric score (block 427). This final list of related documents meets the conditions of the database search provided by the user.

As was mentioned, there are many alternate embodiments possible to implement the database search function. This example was for a reference document to be matched against a database of a single document type (i.e. patents). Examples of alternate implementations include having the user query being just words, multiple processors and algorithms for parallel execution, and databases that are remote or partially remote. All such known implementations of these types of embodiments are contemplated and do not depart materially from the scope of the invention.

Presentation Manager

The Presentation Manger is the primary software interface between the user and the functions for implementing the document search/classification functions. Internal processing results of the document search function above are presented to the Presentation Manager which combines internally available data and formats it in a way understandable to a person. The Presentation Manager also is the primary conduit for input from the user. For example, through the Presentation Manager the user initiates and constructs the query carried out by the Database Search processing block.

There are many different types of systems, programming languages and operating systems capable of implementing the functions of the Presentation Manager and all such implementations are contemplated and considered alternate embodiments. The preferred embodiment is implemented on a PC compatible hardware system using the Microsoft Windows® 7 operating system. The Presentation Manager may be resident on the same hardware system that implements the document analysis function, document search/classification, or the host for the databases. It may be on a system independent of those functional blocks.

The Presentation Manager can be customized for many different types of documents to process (e.g. resumes, patents, news, legal, medical) or a combination of these document types. In the discussions to follow, the Presentation Manager shown is the preferred embodiment that implements only the Document Search function on document types of patents.

FIG. 8 is an example of a Presentation Manager showing the words in the Reference Document. A reference document identifier has been entered into the textbox labeled "Reference Document" (801). The document to be analyzed can be an existing patent or a different document type (e.g. description of a proposed new invention). When the user activates the "Analyze Doc" button (802) on the window, an analysis of the Reference Document is performed.

All the words in the reference document are displayed in the area below the "Analyze Doc" button. If a "*" is placed to the right of the word (803), it indicates that the word is to be used in the Database Search function later. Should the user not wish to include the word, the "*" can be removed, and conversely, words not identified with "*" can be made to be a SearchWord by entering "*" in that field for that word. Note also, that the Word Score field indicates the calculated word importance for that word in that document in the "Detailed Description of the Invention" section of the patent. The words are sorted by the "Word Score" field (804) but by clicking the mouse in that section, the words will be sorted in ascending/descending order.

If the user wants to view the "Reference Document", activating the "Show Doc" button (805) in the window will then produce the display shown in FIG. 9. The Reference Document appears in another Window (810) and the identified document sections are shown in summary. If the section needs to be viewed in its entirety, the box to the left of the document section is clicked by a computer mouse and the identified section is expanded to show the contents of that section.

When the user wants to find documents related to the Reference Document, the database query is constructed from the information on the right side of the main window identified as "Search Control" (811) in FIG. 10. There is a grayed-out section of "Date Range" (812) which is not highlighted since no date range was specified. There is also a section (813) to request only the "Top Results" of the best "50" documents regardless of how good a quality match was calculated for those top 50 documents. Not shown are other database query qualifiers which are activated through the "Actions" drop-down list (also not shown) which allows other parameters to be specified such as which database to use (e.g. US vs. Canadian patents) or document sections (e.g. Abstract, Detailed Description of the Invention).

When the user activates the "Find Related Documents" button (814), the database search function described above is performed and the sorted list of documents meeting the database query criteria is then presented in the area below the "Search Control" heading (815).

It should be noted the Presentation Manager in the preferred embodiment shows the speed of the system through a label on the left side of the window (not shown in drawing) where it indicates that the database search of the collection of the US patents since 1976 (3.7 million documents) took 7 seconds. The PC that performed the entire function of managing the database, database search, and presenting the results was an Intel® Q6600 with 2 GB of memory, a fairly typical computer for the present time. There were 50 words, each with a different word importance value compared against the large database and each of those documents had each of the word's importance value within that document calculated dynamically when it was evaluated. The results from all documents were then sorted to find the top 50 that met the requested criteria.

In the Search Results area that shows the matching results on the right side of the window, the best matching result is of course the original patent. If the "Reference Document" were not a document in the database, it would probably not have a perfect quality match score of "10". Similar patents to "U.S. Pat. No. 5,160,161" (the Reference Document) are listed along with the title of the patent. In FIG. 11, the second best match is patent "U.S. Pat. No. 5,092,625" is selected (shown highlighted when selected by the mouse click). The information about the words in that patent is then displayed in the "Related Document" section of the main window.

At times, it is useful to show why certain documents were shown to be highly correlated to the reference document. The generic term used for this type of data is "decision support" information. If the results presented to the user are not desirable, the user needs to discover ways to modify the request to get more meaningful results. Without such decision support information, it becomes difficult to judge what aspect of the query to modify. Alternatively, if the results are good, the information provides quick verification that the results are reliable.

The first such supporting information about the results is that the title of the patent is presented. The title of the reference document is "Working fluid circuit with line pressure control for vehicle active suspension system". The title of the best matching related document (816) is "Fail detecting system for electromagnetic actuator and fail-safe system for active suspension system incorporating electromagnetic actuator". It appears at least that both documents are talking about active suspension systems giving confidence that the search results are meaningful.

There is a checkbox labeled "Compare Words" (817) that was selected that compares identical words between the Reference Document and the Related Document. Referring to FIG. 11, in U.S. Pat. No. 5,092,625, there are 77 SearchWords (see "Related Documents" area 820) present but only those common to both documents are shown along with the Word Importance value as calculated for that document. For example, FSV (Fail Safe Value) has a word importance value of 0.951 in the Reference Document but 0.524 in the Related Document". As shown, there are many matching words, but more importantly, there are many acronyms, especially the qualified acronyms very relevant to active suspension systems present in the Related Document.

The user may find out more information about any of the words by using the mouse. In FIG. 12, the user clicked the word "PSD" from the "Reference Document" section which displays a new window (825) with information about that word. There is information about nearly 1 million words and in this case, PSD is an acronym and there are several sections of information for that word. As shown, the bare acronym PSD can be "Phase Sensitive Demodulator", "Position Sensing Device", "Postal Security Device", "Packet Start Detection" or ten other acronym phrases. PSD has the low/median/high statistics indicated and appears 229,122 times in 52,049 separate patents.

The generic acronym PSD (i.e. bare acronym) representing many different acronym phrases, appears in multiple patent classifications and is documents. If the "Top patent classifications for this word" section (826) had been checked, it would have shown that when PSD occurs in documents, 7.3% of the time it is in Patent Class 428 (Stock material or miscellaneous articles) and 6.4% of the time it is in Patent Class 430 (Radiation imagery chemistry: process, composition, or product thereof).

FIG. 13 shows multiple windows of the Presentation Manager open simultaneously. As shown, there is the main window (830), the "Reference Document" window (831), the equivalent window for the "Related Document" (832), and the information about a specific word (833). At times, it is quite useful to have multiple displays and different windows open on separate displays.

It is not necessary for a user to have a word in one of the documents to find out its specific information. Under the "Actions" dropdown listbox (not shown), there is an option for "Word Information" where the user can type in any word (840) in FIG. 14) and the system will provide the information it has for that word (841). In this example, the requested word is "realtime" and the information available shows that it is a SearchWord and a hyphenated word. The hyphenated word can be "real-time" or "real time". In previous documents, it was found people used variants of this word such as "real-timeness", "real timeness", and "realtimeness". These variants of the word "realtime" are considered to be the same as "realtime" and processed that way.

The earliest patent in the database that contains "realtime" (or one of its variants) is U.S. Pat. No. 3,930,556. As shown in the lowest section of that window, the patents that contain the highest WordRatio for "realtime" are listed. Interesting to note, U.S. Pat. No. 7,197,237 has only 93 occurrences of the word but is more important to that patent than it is in U.S. Pat. No. 5,928,322 where there are 128 occurrences. The reason for that difference is that there are fewer words in U.S. Pat. No. 7,197,237 (recall the normalization is done on the ten base words previous discussed).

Alternate embodiments can provide much more information about a known word. When using multiple document types, the information about which document types the word is within, the percentage of the time in each type the word occurs, the word importance value can be shown.

In FIG. 11, the words common between the Reference Document and the Related Document were shown when the "Compare Words" checkbox (817) was active. If that checkbox is not active, as shown in FIG. 15, the results have the Related Document words listed in descending order based on the "Word Score" field (850). This feature allows the user to see the most important words for that document to better understand how they compare with the Reference Document.

There are many ways to compare two documents and then present that information to the user. In alternate embodiments, all such ways known in the art should be considered to be within the scope of the invention.

When various areas are activated by a mouse click, additional functions are possible. When the user uses a right mouse click in the Search Control section, the results of the search can be saved to a file. This allows a user to later retrieve and continue their work or forward the information to another person. Words in each patent can be saved to a file; information about any word can be saved to a file. Information can be copied to the electronic clipboard and transferred to other open programs on the computer.

In alternate versions of the Presentation Manager for the document search function, the user provides a list of words that are of interest (e.g. puts that information in the Word List on the left side of the main window), uses filter criteria such as that previously discussed, and is presented with the results as discussed. Other alternate versions of the Presentation Manager can be optimized for resume documents, news articles, legal documents, or other types of documents.

In summary, the main aspects of the Presentation Manager are that it:

- Presents information to allow selection of a document to be analyzed (and/or sections within the document).
- Provides filters to restrict the types of documents to be returned (e.g. date range, quantity, quality)
- Provides the results of the database search
- Provides information about the documents returned from the database search.
- Provides decision support information to identify quickly the most relevant results. It provides additional information as to why the documents match (e.g. words/acronyms in common, what words mean, how words are used, other related documents to each word).
- Ability to save the results or other interesting information.

There is no restriction as to the types of displays and systems that implement the Presentation Manager. The preferred embodiment discussed of using a PC and having an attached display, computer mouse, and perhaps a keyboard is one of many possible configurations. A display residing on a Personal Digital Assistant, a smart phone such as a Google Android® smart phone, or a display remote from the Presentation Manager should be considered as equally useful alternate embodiments. Similarly the input methods of speech, touch screen, or other interaction technologies however they are attached to a device can be considered as alternate embodiments.

The intuitive and useful linking of the words, documents, search results, and support information associated with why documents were found to be useful make up the novel aspects of the Presentation Manager. Other equivalent prior-art Presentation Managers can also be used with the other novel dictionary and search embodiments of the invention previously described.

Document Classification

Much of the previous discussion has concerned using the inter-related dictionaries, SearchWords, and document analysis as applied to the document search function. This section goes into more detail how to use those embodiments of the invention to perform document classification. As used in the remainder of this section, the document classification function takes a reference document and determines which classes that document should become a member. A reference document can be in one or more classes simultaneously.

As one illustration of the usefulness of the classification function, assume that a company has a patent portfolio of 8,000 patents and wants to classify them for purposes of creating license groups. Assuming the patents are in the telecommunications art, there could be patents related to telephone central office equipment, tools to install telephone lines, phones, or modems for a customer, video services, cell phone services, billing systems technology, call center operations, network rerouting in the event of component failures, and other such normal business operations.

The selection of criteria for classification areas is more a matter of how the information is desired to be used rather than the technology of the patent. Patent portfolios are something that can be sliced and diced in many different ways and often a patent is useful in more than one group. It can be difficult for a person to know all different areas or terms intrinsic in such area. A useful automated system is one that simply follows the example set by the person establishing the categories.

The self-learning embodiment of the invention that has been previously described is readily adapted to the dynamic changes needed for document classification. Some of the basic steps involved in classification are:

- n. Identify important words across all documents
- o. Learn association between words and classifications.
- p. Determine which classifications can contain the same document (overlapping) and which ones must contain the document exclusively (non-overlapping)
- q. Calculate the word importance in each classification
- r. Match a reference document based on word importance based on importance across classifications and importance of a word in the reference document.
- s. Present the results of the classification along with the decision support information.

Several of these steps are quite similar between the document search and document classification function. Identifying the list of words across all documents is done identically. For the example of classifying patent portfolios, using the list of words from the document search will generate the appropriate list of words. The difference for the SearchWords will be that its importance value will now be calculated based on the importance to each unique classification specified by the user instead of the patent classification specified by the patent office.

Adapting the technique previously described for document search, words that are most different between user classes will be given higher scores than those words present in all classifications. During the database search process, scores will be calculated for each new Reference Document for each potential classification and then a decision is made as to which non-overlapping classifications it belongs (if it must belong to one of the classifications). Quality metric scores are then used to decide which overlapping classifications (if any) that the Reference Document should join.

If the user wants to see the information to support the assignment of the document to a particular classification, scores, common words between the Reference Document and the Average score for the word in each potential classification are displayed in the preferred embodiment of the Presentation Manager.

System of the Invention

In order to show how these algorithms combine to produce a useful result, its application in document searches is explained. Again, the embodiments of the invention is contemplated for many different uses and considered within the scope of the invention. While analyzing the reference document and analyzing the unknown document follows similar steps, adaptations to the algorithm are required to produce superior results. These adaptations are discussed below.

The system (or systems) that implement these algorithms can be of many different types. One such type of system could be a desktop, Windows based, operating system running on a Pentium processor or could be a multiuser, network system, using a Linux operating system running on a Sparc server. Handheld systems, organic processors, and nanotechnology are systems that might eventually be able to perform the logic described by these algorithms.

As shown if FIG. 16, the placement of data, processing blocks, and the placement of input/display for user interaction can have many variations. Source Documents can be obtained from many different locations, originating locally (901) and/or remotely (902). The Source Document Database (402) may be the electronic version of the document or store the information on how to retrieve the document. Examples of access to remote documents may be through a web link, an SQL query to a database located at another processing entity, or to a disk on an adjacent server.

The processing system to analyze the source documents using the methods explained previously explained is shown in block 903. This is used to create the analyzed Document Database (405) containing the information about the words/acronym/phrases in the source documents. This processing system may be local or remote from the Source Document Database (402).

The System to build the list of SearchWords and list of documents which contain each SearchWord is shown as block 904. This processing system may physically be the same system as one of the other processing or database systems or may be an independent processing system. This system uses the information of the Source Document Database (402) and the Analyzed Document Database (405) to create the SearchWords & SearchWord Doc List of 102.

When performing the Document Search or the Document Classification function, the processing system (905) to do this can be a standard PC of the type previously mentioned, a server within a company, or a server within the network that can be accessed by a variety of systems. Again it may be physically the same processing system as any of the other processing systems mentioned, part of the database system(s) or may be an independent processing system. The Reference document (408) used in document search or document classification can be local to 905 or remote. For example, the document can be a user's computer (412), on a local server, on a remote server, or reside on a Personal Digital Assistant (PDA) or Smart Phone such as on the Google Nexus (907).

Using the methods previously described for document search/classification, block 905 analyzes the reference document, accesses the information in 405, 402, 102, and/or other sources to provide the results to the Presentation Manager. The System of the Presentation Manager (906) from the Analyzed Document Database (405) can also be implement on many types of platforms (e.g. PC, company Server, network server, smart phone) and may be physically resident on any of the processing systems mentioned or on one of the database systems.

When a smart phone or PDA is mobile with a user, there are a number of advantages to extend the efficiency of communications between a user and one of their clients. For example, if Job recruiter is at job fair, the applicant could electronically send the recruiter their resume and have the system instantly be matched to existing jobs at the company or at companies where that independent recruiter has a business relationship.

The recruiter could also be at a company and show an HR representative candidates meeting requirements for a job specification. Because of many Acronym related problems associated with resumes (and other problems solved by the invention), prior-art systems could not obtain the superior results. Recruiters today are reluctant to expose poor results from existing matching systems to their end-clients because it reflects poorly on their ability to provide the right candidate. Using the results provided by the method and system of the present invention, there is an increase in productivity for these professionals.

When used in a patent search application, patent agents or attorneys can more rapidly assess the viability of an invention to make it through the time consuming and expensive process required to obtain a patent. This rapid screening of millions of documents in seconds with the high quality results has been found to be very advantageous.

While many algorithms are employed to make a functional system of the present invention, no significance should be inferred about the sequence in which these should operationally be done. Similarly, the systems that implement these algorithms are described functionally in many different ways without departing materially from the scope of the invention. The systems may be operated separately, sequentially, in parallel, or in any combination thereof.

Non Reference Document Searches

The primary method of performing searches of documents previously discussed was to use a reference document that had the significant words automatically identified and importance values assigned. There is also a need to be able to search documents at times using a selection of words provided by a user.

There are many different document search programs today that can take a small number of words and search for those words in a collection of documents. Some of the weaknesses of these existing systems are:

- The words are given an equal priority when searching through documents. (e.g. a binary search)
- The presence of the word once in a document provides the same results as when the word occurs multiple times.
- Uniqueness of the word is not considered within the context of classification or document sub-sets.
- Many search algorithms do not include variants of the word when doing a search so that the plural of the word, misspellings of the word, or word tense would not have that document included in the that search results.
- Phrases would normally require the exact words to be matched. Variations of a phrase would not be accurately matched (i.e. "analog to digital converters" and "analog to digital converter" would yield different matching documents).
- When acronyms are used, matches may occur for acronyms that can have different meanings. (e.g. VMS could match documents containing VMS as in "Voice Mail System" or VMS as in "Vehicle Management System".

Using the novel methods of the present invention, it is possible to significantly improve the quality of matching these manually-initiated searches. Compared to other types of searches, the resulting benefits are:

- When the person provides a word, all forms of the word in the dictionary are automatically included in the search results.
- If the person provides an acronym, the person is asked which of the potential variants of that acronym were intended. The search results would include documents that would have the phrase associated with the acronym even if the acronym itself was not present. Alternatively, the person could provide a phrase such as "analog to digital converter" and the search could include that phrase along with variants such as the acronym ADC (analog to digital converter), "a/d converter", or "a-to-d converter".
- Words chosen by the person may not be the best words used in searching a particular database. The system has learned important words by finding that words that are most different in different classifications as was previously described. When the person provides the word list for searching, an indication is made as to its status as one of the important SearchWords. The person may then consider providing a different word should that be considered more suitable for purposes of searching. In prior art systems, there is no indication as to how useful particular words can be in distinguishing words suitable for a particular database/topic.
- Words would not necessarily have the same importance. When the word is provided by the user for the manual search, the system-generated importance value (as previously discussed). This value is combination of factors including a word's Base Importance values across all documents, its value based on the section of the document where it occurs, the length of the document, and the number of times a word normally appears in a document (10%, median, 90% occurrence).
  - An option is available to have the person assign the word's Base Importance. Since the person probably wants to have the word(s) they provide have importance in the matching document, this can be a useful feature. During the document search/classification process, the document scoring algorithm will use the newly assigned Base Importance value along with the system's knowledge of other aspects of words/documents to produce a higher quality match. For example, the system knows how many times each particular word should occur in a document before it is considered important (i.e. 10%, median, 90% occurrence). Therefore, if the word occurs less frequently in a particular document being searched (or classified), the resulting matching score is lower and more important documents occur ahead of lower scoring documents.
- As in a search employing a reference document, the non reference document search allows the search results to be restricted in certain ways such as to specific date ranges, number of results, quality of results, or sections of documents to be searched.

Exemplary Embodiment of the Invention

The following steps comprise an example of an embodiment of the invention for operating a computerized document search system where information is matched against a database containing documents in response to user queries.

(a) receiving a query identifying a source document that has information content related to the documents within the database;

(b) automatically detecting at least one important word within the source document where at least one of the important words has been processed using at least two dictionary functions selected from a group of dictionary functions consisting of Derived Words; Acronym; Word Capitalization; and Hyphenation;

(c) processing documents in the database in which an importance value of each of the important words for at least one processed document is generated using a WordRatio and at least one value selected from a group of values consisting of:

a value defined for at least one of the important word related to a document section that occurs in the document;

a value defined for the important word in at least one classification associated with the document;

a value defined for the important word in a document type that applies to the document;

a value defined for the important word across multiple document classifications; and a value based on the statistical occurrence of the important word across at least two different documents; and (d) generating a score for a processed document based partly on the importance value of at least one important word in that document.

Optionally, performing the step of creating a document list having at least one document identified that is related to the source document and an indication of the quality of the match between the source document and the related document.

Optionally, performing the step of a Presentation Manager using the document list to show the identity of at least one document from the document list to the user.

Optionally, performing the step of the Presentation Manager using information from the identified document and displaying the information to the user.

Optionally, performing the step of modifying the document score by selected user-specified criteria.

Optionally, performing the step of identifying at least one undefined acronym to be a qualified acronym derived from other words present within the document.

In another example of a method in accord with an embodiment of the invention, the method includes the steps of:

(a) generating a list of classification important words for distinguishing between document classifications wherein each classification important word has a classification importance value;

(b) selecting a reference document that has information content related to at least one document classification;

(c) automatically detecting the classification important words within the reference document wherein at least one of the words from the reference document has been processed using at least two dictionary functions selected from a group of dictionary functions consisting of:

Derived Words;
Acronym;
Word Capitalization; and
Hyphenation;

(d) generating a word score value for at least one of the detected classification important words from the reference document using a WordRatio and at least one value selected from a group of values consisting of:

a value defined for the detected classification important word related to a document section that occurs in the reference document;

a classification importance value for the classification important word;

a value defined for the detected classification important word in a document type that applies to the document;

a value defined for the detected classification important word across multiple document classifications; and a value based on the statistical occurrence of the detected classification important word in at least two different documents; and (e) generating a classification score for the reference document that is related to at least one of the word score value.

Optionally performing the step of the step of assigning the reference document to at least one document classification.

Optionally performing the step of a Presentation Manager providing the user with information about at least one assigned classification for the reference document.

Optionally performing the step of relating the classification score to selected user specified criteria.

Optionally performing the step of identifying at least one undefined acronym to be a qualified acronym related to other words within the reference document.

Optionally performing the step of determining at least one of the classification important words by comparing the number of occurrences of the classification important word in a first document from a first classification and a second document from a second classification.

An example of a system for facilitating electronically stored documents in accord with an embodiment of the invention includes:

a database of electronically stored documents;

a means for processing words from at least one document using at least two dictionary functions selected from a group of dictionary functions consisting of:

Derived Words;
Acronym;
Word Capitalization; and
Hyphenation;

a means for generating a list of important words for distinguishing between classifications wherein each important word has an importance value;

a means for generating a score for the at least one document in which a score for the at least one document is partially derived from a WordRatio value of a word identified as an important word; and a list of document classifications for the electronically stored documents and an indication of a quality of a match between each of the electronically stored documents and each document classification.

The system optionally includes a Presentation Manager adapted to use at least one classification from the list of document classifications to show an assigned classification of the reference document to a user.

What is claimed is:

1. A method of operating a computerized document classification system, comprising the steps of:

generating at least one classification important word for distinguishing between two or more document classifications, wherein each classification important word has a classification importance value;

selecting a reference document having information content comprising a plurality of words related to at least one of the two or more document classifications;

automatically detecting at least one classification important word from the plurality of words within the reference document, wherein the at least one classification important word from the reference document has been processed using at least two dictionary functions selected from a group of dictionary functions consisting of:

Derived Words;
Acronym;
Word Capitalization; and
Hyphenation;

generating a word score value for the at least one detected classification important word from the reference document using a WordRatio, which comprises a normalization factor for the detected classification important word that is based upon the relative occurrences of a predetermined plurality of base words, and at least one value selected from a group of values consisting of:

a value defined for the at least one detected classification important word related to a document section that occurs in the reference document;

a classification importance value for the at least one detected classification important word;

a value defined for the at least one detected classification important word in a document type that applies to the document;

a value defined for the at least one detected classification important word across multiple document classifications; and a value based on the statistical occurrence of the at least one detected classification important word in at least two different documents comparing the number of occurrences of the at least one classification important word in a first document having a first classification and a second document having a second classification; and generating a classification score for the reference document that is related to the word score value for the at least one detected classification important word.

2. The method of claim 1, further comprising the step of assigning the reference document to at least one document classification.

3. The method of claim 2, further comprising the step of a Presentation Manager providing the user with information about the at least one assigned document classification for the reference document.

4. The method of claim 1, further comprising the step of relating the classification score to at least one selected user specified criteria.

5. The method of claim 1, further comprising the step of identifying at least one undefined acronym to be a qualified acronym related to other words within the reference document.

6. A method of operating a computerized document classification system, comprising the steps of:
   generating at least one classification important word for distinguishing between two or more document classifications, wherein each classification important word has a classification importance value;
   selecting a reference document having information content comprising a plurality of words related to at least one of the two or more document classifications;
   automatically detecting the at least one classification important word from the plurality of words within the reference document, the at least one classification important word identified as a SearchWord wherein the at least one classification important word from the reference document has been processed using at least two dictionary functions selected from a group of dictionary functions consisting of:
   Derived Words;
   Acronym;
   Word Capitalization; and
   Hyphenation;
   generating a word score value for the at least one detected classification important word using a WordRatio, which comprises a normalization factor for the detected classification important word that is based upon the relative occurrences of a predetermined plurality of base words and at least one value selected from a group of values consisting of:
   a value defined for the at least one detected classification important word related to a document section that occurs in the reference document;
   a classification importance value for the at least one detected classification important word;
   a value defined for the at least one detected classification important word in a document type that applies to the reference document;
   a value defined for the at least one detected classification important word across multiple document classifications; and
   a value based on the statistical occurrence of the at least one detected classification important word in at least two different documents; comparing the number of occurrences of the at least one classification important word in a first document having a first classification and a second document having a second classification; and
   generating a classification score for the reference document that is related to the word score value for the at least one detected classification important word.

7. The method of claim 6, further comprising the step of assigning the reference document to at least one document classification.

8. The method of claim 7, further comprising the step of a Presentation Manager providing the user information about at least one assigned document classification for the reference document.

9. The method of claim 6, further comprising the step of relating the classification score to at least one selected user-specified criteria.

10. The method of claim 6, further comprising the step of identifying at least one undefined acronym to be a qualified acronym derived from other words within the reference document.

11. A method of operating a computerized document classification system comprising the steps:
    generating at least one classification important word for distinguishing between two or more document classifications, wherein each classification important word has a classification importance value;
    selecting a reference document having information content comprising a plurality of words related to at least one of the two or more document classifications;
    automatically detecting at least one classification important word within the reference document, the at least one detected classification important word identified as a SearchWord where the SearchWord is selected in part by using a WordRatio, which comprises a normalization factor for the SearchWord that is based upon the relative occurrences of a predetermined plurality of base words related to a document classification and a number of document classifications that contain the SearchWord;
    processing a document in a database in which the classification importance value of the at least one detected classification important word within the document being processed is partially derived from the WordRatio and at least one value selected from a group of values consisting of:
    a value defined for the at least one detected classification important word related to a document section that occurs in the document being processed;
    a classification importance value for the at least one detected classification important word;
    a value defined for the at least one detected classification important word in a document type that applies to the document being processed;
    a value defined for the at least one detected classification important word across multiple document classifications; and
    a value based on the statistical occurrence of the at least one detected classification important word across at least two different documents comparing the number of occurrences of the at least one classification important word in a first document having a first classification and a second document having a second classification; and
    generating a score for the document being processed based in part on the importance value of the SearchWord in the document being processed.

12. The method of claim 11, further comprising the step of assigning the reference document to at least one document classification.

13. The method of claim 12, further comprising the step of a Presentation Manager providing the user information about the at least one assigned document classification for the reference document.

14. The method of claim 11, further comprising the step of relating the classification score to at least one selected user-specified criteria.

15. The method of claim 11, further comprising the step of identifying at least one undefined acronym to be a qualified acronym derived from other words within the reference document.

16. A method of operating a computerized document classification, comprising the steps of:
- establishing at least one classification important word for a plurality of document classifications derived from words likely to be within the document classifications;
- (b) automatically detecting the at least one classification important word within a reference document wherein the at least one classification important word from the reference document has been processed using at least two dictionary functions selected from a group of dictionary functions consisting of:
  - Derived Words;
  - Acronym;
  - Word Capitalization; and
  - Hyphenation;
- processing documents in a database in which an importance value of the at least one classification important word for each processed document is generated using a WordRatio, which comprises a normalization factor for the classification important word that is based upon the relative occurrences of a predetermined plurality of base words and at least one value selected from a group of values consisting of:
  - a value defined for the at least one classification important word related to a document section that occurs in the document being processed;
  - a classification importance value for the at least one classification important word;
  - a value defined for the at least one classification important word in a document type that applies to the document being processed;
  - a value defined for the at least one classification important word across multiple document classifications; and
  - a value based on the statistical occurrence of the at least one classification important word across at least two different documents; comparing the number of occurrences of the at least one classification important word in a first document having a first classification and a second document having a second classification;
- generating a classification score for the reference document that is related to at least one word score value for the at least one classification important word; and
- providing a list of documents from the database that are related to at least one word of the at least one classification important word and to an indication of a quality of a match between the at least one classification important word and each related document in the database.

17. The method of claim 16, further comprising the step of processing at least one classification important word using at least two dictionary functions selected from a group of dictionary functions consisting of:
- Derived Words;
- Acronym;
- Word Capitalization; and
- Hyphenation.

* * * * *